(12) United States Patent
Han et al.

(10) Patent No.: US 11,137,840 B1
(45) Date of Patent: Oct. 5, 2021

(54) STYLUS PEN, TOUCH-SENSING SYSTEM, TOUCH-SENSING CONTROLLER, AND TOUCH-SENSING METHOD

(71) Applicants: LEADING UI CO., LTD., Anyang-si (KR); Sang-hyun Han, Anyang-si (KR)

(72) Inventors: Sang-hyun Han, Anyang-si (KR); Jae-sung An, Seoul (KR)

(73) Assignee: LEADING UI Co., Ltd.

( * ) Notice: Subject to any disclaimer, the term of this patent is extended or adjusted under 35 U.S.C. 154(b) by 408 days.

(21) Appl. No.: 16/321,463

(22) PCT Filed: Aug. 17, 2017

(86) PCT No.: PCT/KR2017/008919
§ 371 (c)(1),
(2) Date: Jan. 28, 2019

(87) PCT Pub. No.: WO2018/034496
PCT Pub. Date: Feb. 22, 2018

(30) Foreign Application Priority Data

Aug. 17, 2016 (KR) .................. 10-2016-0104165

(51) Int. Cl.
*G06F 3/0354* (2013.01)
*G06F 3/044* (2006.01)
*G06F 3/038* (2013.01)

(52) U.S. Cl.
CPC .......... *G06F 3/03545* (2013.01); *G06F 3/038* (2013.01); *G06F 3/0442* (2019.05)

(58) Field of Classification Search
CPC .... G06F 3/03545; G06F 3/0446; G06F 3/044; G06F 3/041

USPC ......................................... 345/179, 173–174
See application file for complete search history.

(56) References Cited

U.S. PATENT DOCUMENTS

| | | | |
|---|---|---|---|
| 6,043,810 A | 3/2000 | Kim et al. | |
| 9,658,720 B2* | 5/2017 | Kremin | G06F 3/0442 |
| 9,710,075 B2* | 7/2017 | Hamaguchi | G06F 3/03545 |
| 9,939,930 B2* | 4/2018 | Bell | G06F 3/03545 |
| 2011/0042152 A1* | 2/2011 | Wu | G06F 3/04166 |
| | | | 178/18.03 |
| 2013/0106720 A1 | 5/2013 | Shahparnia et al. | |

(Continued)

FOREIGN PATENT DOCUMENTS

KR 10-2012-0082577 A 7/2012
KR 10-2014-0022222 A 2/2014

(Continued)

OTHER PUBLICATIONS

International Search Report dated Nov. 17, 2017.

*Primary Examiner* — Koosha Sharifi-Tafreshi
(74) *Attorney, Agent, or Firm* — Leepi

(57) ABSTRACT

A stylus pen, a touch sensing system having the stylus pen, a touch sensing controller employed therein and a touch sensing method using the touch sensing system are disclosed. A stylus pen includes a conductive pen case made of a conductive material, a stylus tip connected to a first terminal of the conductive pen case, and a signal supply part supplying a pen driving signal to the stylus tip and providing the conductive pen case with a palm rejection signal. A palm rejection signal different from the pen driving signal applied to the stylus tip is applied to the conductive pen case, thereby achieving a palm rejection function.

20 Claims, 28 Drawing Sheets

(56) References Cited

U.S. PATENT DOCUMENTS

2013/0300672 A1   11/2013  Griffin
2019/0163320 A1*  5/2019  Park ..................... G06F 3/0442

FOREIGN PATENT DOCUMENTS

| KR | 10-2015-0017168 A | 2/2015 |
| KR | 10-2016-0042236 A | 4/2016 |

* cited by examiner

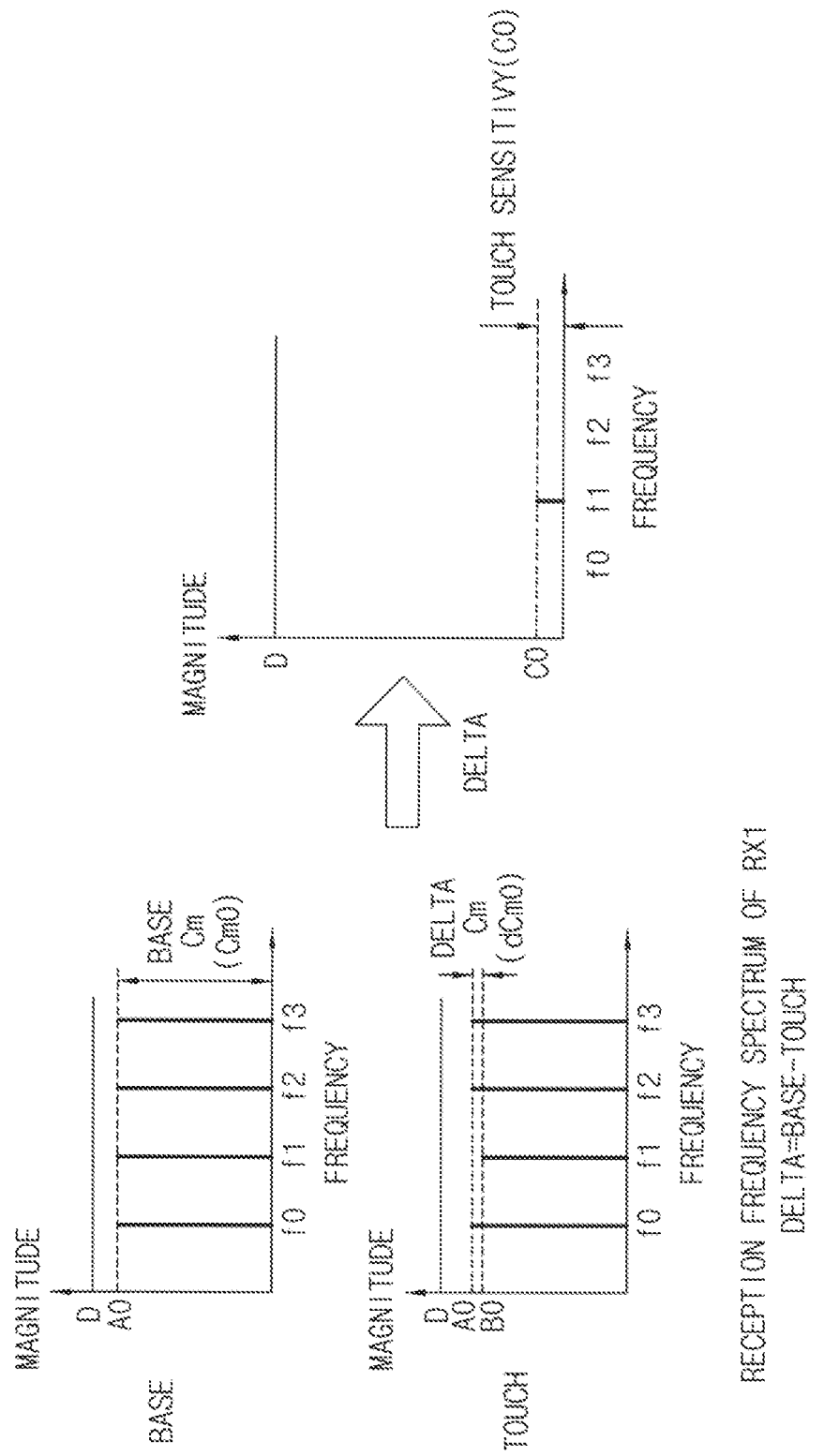

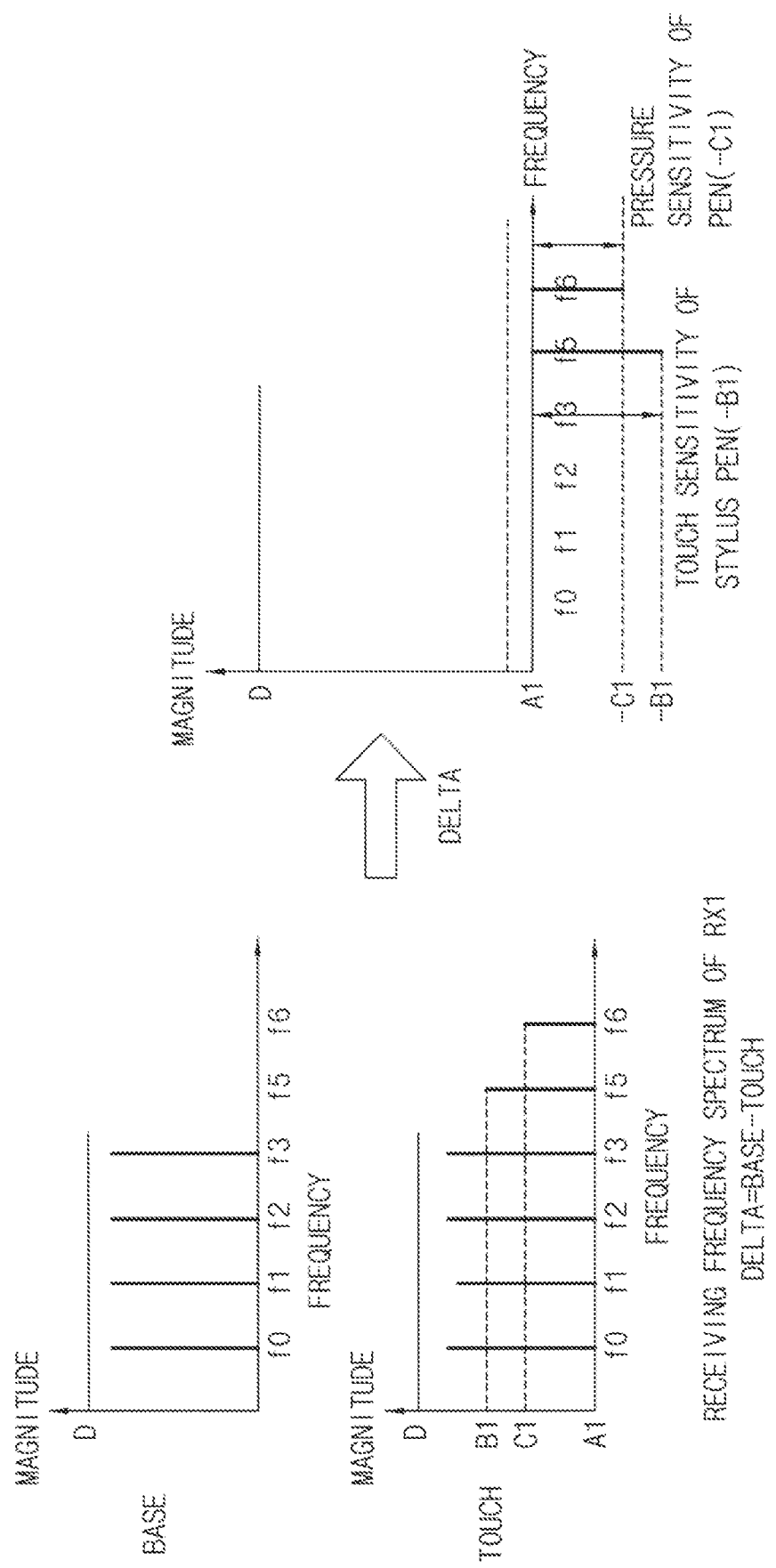

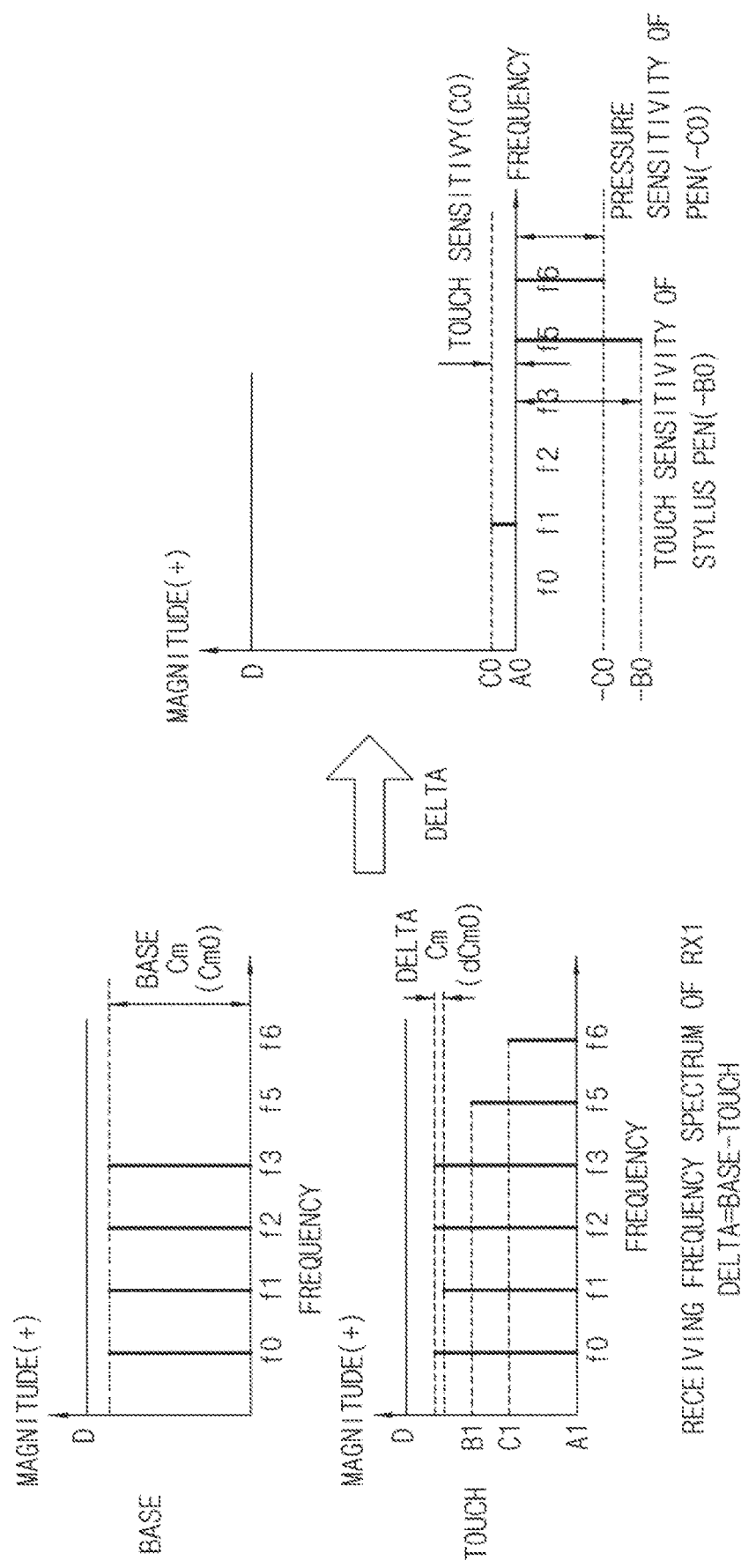

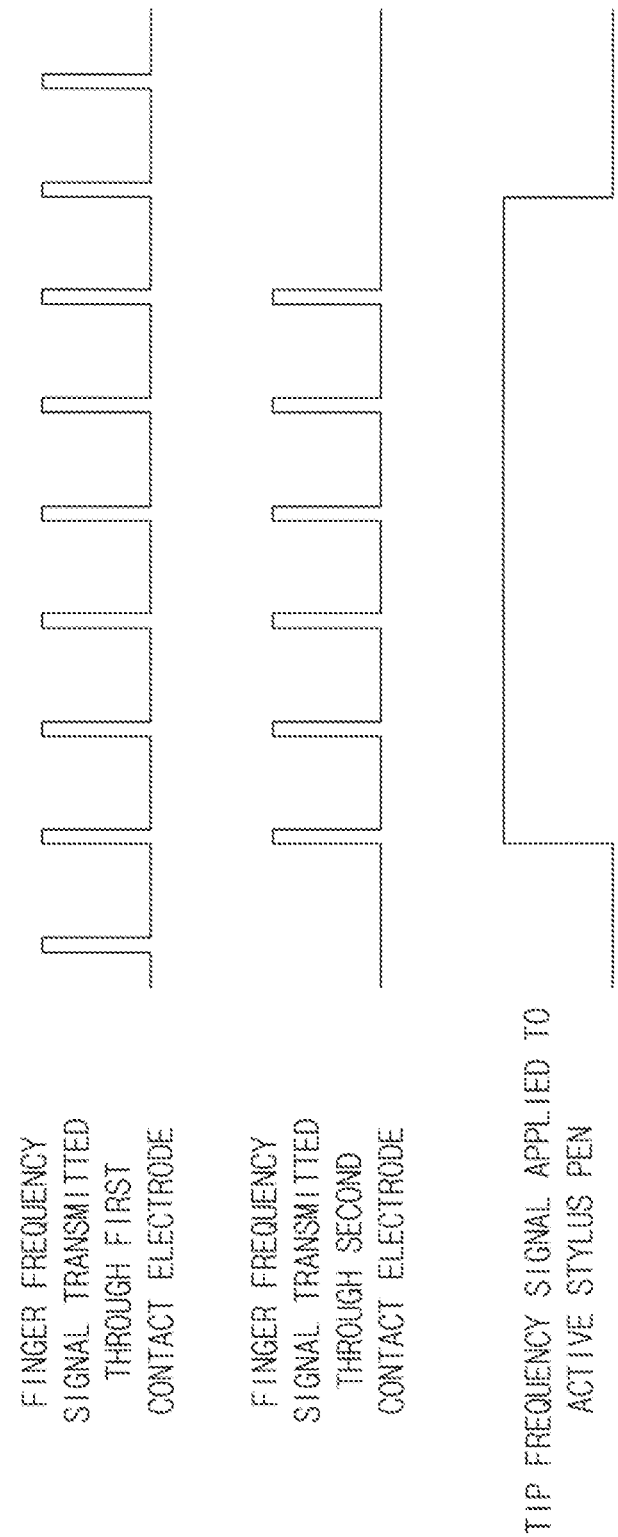

STYLUS PEN, TOUCH-SENSING SYSTEM, TOUCH-SENSING CONTROLLER, AND TOUCH-SENSING METHOD

CROSS-REFERENCE TO RELATED APPLICATIONS

This application is a U.S. National Phase of International Application Number PCT/KR2017/008919, filed Aug. 17, 2017, and claims priority under 35 U.S.C. § 119 to Korean Patent Application No. 10-2016-0104165, filed on Aug. 17, 2016 in the Korean Intellectual Property Office (KIPO), Korean Patent Application No. 10-2016-0105432, filed on Aug. 19, 2016 in the Korean Intellectual Property Office (KIPO), and Korean Patent Application No. 10-2016-0164205, filed on Dec. 5, 2016 in the Korean Intellectual Property Office (KIPO), the contents of which are herein incorporated by reference in their entirety.

BACKGROUND OF THE INVENTION

Technical Field

Exemplary embodiments of the present invention relate to a stylus pen, a touch sensing system having the stylus pen, a touch sensing controller employed therein and a touch sensing method using the touch sensing system.

Discussion of the Related Art

Flat panel displays (hereinafter, referred to as "display devices") are used in various types of electronic products including mobile phones, tablet PCs, notebook computers, and the like. Flat panel displays include a liquid crystal display (LCD), a plasma display (PDP), an organic light-emitting display (OLED), and the like. Recently, electro-phoretic display (EPD) is also widely used.

A touch screen panel is a type of input device that is installed in a display device and enables a user to directly touch a screen with a finger or a pen while viewing the display device to input information.

As a method of sensing a touch, there is a method of sensing a touch using a change in capacitance. A capacitance method is a method of judging the presence or absence of a touch and the touch coordinates by sensing a change in capacitance when a human body or a conductive material touches a touch screen panel.

The capacitance method may also be applied to a method of determining the presence or absence of touch by the pen. For example, in the case where a conductive material is present in the pen, the presence or absence of the touch may be determined using the change in capacitance between the pen and the touch screen panel.

Moreover, as described in U.S. Patent Publication No. 2013-0106720 and the like, when an active pen for outputting a pen voltage is used so that the touch sensing unit may sense the pen, it may be determined whether or not it is touched on a capacitive touch screen panel by a finger and an active pen.

Moreover, as described in Korean Patent Laid-Open Publication No. 10-2014-0022222, when a stylus pen that outputs a pen signal by radio is used when a touch driving voltage is received from the touch screen panel, the display device having the touch screen panel receives the pen signal and determines a position where the touch screen panel is touched by the stylus pen.

In a display device for determining a presence or absence of a touch by the stylus pen, the touch screen panel may be used for determining whether or not the user's finger touches.

The user using the stylus pen contacts the touch screen panel through the side of the hand in a writing habit. In this case, the display device determines that there is a touch at a portion where the side of the hand touches.

However, since the area determined to be touched by the side contact of the hand is not the intended touch area by the user, the touch area should not be recognized as a touch. In this case, a conventional display device performs a palm rejection function in order not to recognize the touch area by touch.

FIG. 1 is a schematic diagram explaining a palm touch generated on a touch screen panel by a conventional stylus pen.

As shown in FIG. 1, it is difficult to distinguish the touch by the side of the hand and the touch by the finger, so that the touch by the side of the hand is difficult to be removed in the conventional display device. In more detail, the judgment as to whether or not the touch is made by the finger and the judgment as to whether or not the touch is made by the stylus pen are performed individually, so that they do not affect each other.

However, due to the habit of the user holding the stylus pen, when the stylus pen is used, the side of the user's hand touches the touch screen panel. In this case, raw data (raw data) used for touch presence determination is generated by touching by the side of the hand. Such low data may be an obstacle when judging whether or not the touch by the stylus pen is present. Accordingly, an unintended touch area other than the touch area by the stylus pen may be sensed.

SUMMARY

Exemplary embodiments of the present invention provide a stylus pen that realizes a palm rejection function by providing a palm rejection signal different from a pen driving signal, a touch sensing system having the stylus pen, and a touch sensing method using the same.

Exemplary embodiments of the present invention also provide a touch sensing system capable of simultaneously realizing finger touch recognition and pen touch recognition, realizing multi-touch recognition of stylus pens, a touch sensing controller and a stylus pen employed therein.

Exemplary embodiments of the present invention further also provide a stylus pen having a power saving function by controlling the output of a signal for driving the stylus pen when the stylus pen is used and when it is not used, and a driving method thereof.

According to one aspect of the present invention, a stylus pen includes a conductive pen case made of a conductive material, a stylus tip connected to a first terminal of the conductive pen case, and a signal supply part supplying a pen driving signal to the stylus tip and providing the conductive pen case with a palm rejection signal.

According to another aspect of the present invention, a touch sensing system includes an active stylus pen, a touch screen panel and a read-out circuit. The active stylus pen includes a conductive pen case of a conductive material, a stylus tip connected to a first terminal of the conductive pen case, and a signal supply part supplying a pen driving signal to the stylus tip and providing the conductive pen case with a palm rejection signal. The touch screen panel includes a driving line transmitting the pen driving signal and the palm rejection signal and a sensing line transmitting a sensing signal induced in the driving line. The read-out circuit classifies a first signal corresponding to the pen driving signal and a second signal corresponding to the palm rejection signal provided from the sensing line, ignores the touch caused by the second signal, and calculates touch coordinates based on the first signal.

According to another aspect of the present invention, there is provided a touch sensing method. In the touch sensing method, a pen driving signal and a palm rejection signal are generated. A stylus tip is provided with the pen driving signal. The palm rejection signal is applied to the conductive pen case. A sensing signal induced in a driving line transmitting the pen driving signal and the palm rejection signal are sensed through a sensing line. The sensing signal is classified into a first signal corresponding to the pen driving signal and a second signal corresponding to the palm rejection signal. The touch coordinates is calculated based on the first signal while ignoring the touch caused by the second signal.

According to another aspect of the present invention, a touch sensing system includes a touch screen panel, an active stylus pen and a touch sensing controller. The touch screen panel includes a plurality of driving electrodes and a plurality of sensing electrodes. The active stylus pen provides the touch screen panel with a pen frequency signal set to sense the position of the active stylus pen, the pressure of the active stylus pen, and the tilt of the active stylus pen. The touch sensing controller outputs a plurality of driving signals having different frequency components to the touch screen panel, and determines at least one of touch coordinates of the finger and touch coordinates of the active stylus pen based on a plurality of sensing signals received at the touch screen panel.

According to another aspect of the present invention, a touch sensing controller includes a touch driving part, a touch sensing part and a touch determining part. The touch driving part is connected to driving electrodes of a touch screen panel contacting an active stylus pen outputting a pen frequency signal set to sense the position of the active stylus pen, the pressure of the active stylus pen and the tilt of the active stylus pen to output the driving signals to the driving electrodes. The touch sensing part is connected to sensing electrodes of the touch screen panel to receive the sensing signals through the sensing electrodes. The touch determining part determines at least one of touch coordinates of a finger and touch coordinates of the active stylus pen based on the sensing signals.

According to another aspect of the present invention, a stylus pen includes a tip electrode, a pressure sensor, a frequency signal generator, a mixer and a ring electrode. The tip electrode is contactable with a touch screen panel. The pressure sensor measures a pressure of the tip electrode applied to the touch screen panel to output a pressure sensing signal. The frequency signal generator generates a pressure sensing signal based on the pressure sensing signal, and generates a position sensing signal set for sensing a position of the active stylus pen and a tilt sensing signal set for sensing a tilt of the active stylus pen. The mixer mixes the position sensing signal and the pressure sensing signal and provides a mixing signal to the tip electrode. The ring electrode spaced apart from the tip electrode and the pressure sensor by a predetermined distance to receive the tilt sensing signal.

According to another aspect of the present invention, a stylus pen includes a pen body, a multi-frequency output part, a stylus tip, a first contact electrode, a second contact electrode and a controller. The multi-frequency output part is disposed in the pen body to output a finger frequency signal and a tip frequency signal. The stylus tip is disposed in an end portion of the pen body to receive the tip frequency signal and to output the tip frequency signal. The first contact electrode is disposed on a side surface of the pen body to receive the finger frequency signal. The second contact electrode is spaced from the first contact electrode to be disposed on another side surface of the pen body to receive a finger frequency signal from the first contact electrode via a finger. The controller determines (i) it as an untouch state of the active stylus pen when it is determined that the finger frequency signal is not transmitted to the second contact electrode, determines (ii) it as a touch state of the active stylus pen when it is determined that the finger frequency signal is transmitted to the second contact electrode, and requests the output of the tip frequency signal to the multi-frequency output part.

According to the driving method of the stylus pen according to the embodiment of the present invention, a finger frequency signal is generated. The finger frequency signal is provided to a first contact electrode disposed on a portion side of a pen body. Then, it is determined that the active stylus pen is in an untouched state when it is determined that the finger frequency signal is not transmitted to a second contact electrode spaced from the first contact electrode. Then, a tip frequency signal is generated based on a touch state of the active stylus pen when it is determined that the finger frequency signal is transmitted to the second contact electrode through the first contact electrode. Then, the tip frequency signal is outputted to a stylus tip disposed at an end portion of the pen body.

According to some exemplary embodiments of the present invention, a palm rejection signal different from the pen driving signal applied to the stylus tip is applied to the conductive pen case. The palm rejection signal is provided to the touch screen panel via the user's hand. In the read-out circuit, a first signal corresponding to the pen driving signal and a second signal corresponding to the palm rejection signal are classified from the sensing signal sensed through the sensing line. The palm rejection function may be achieved by calculating the touch coordinates based on the first signal while ignoring the touch caused by the second signal when calculating the touch coordinates.

Moreover, a plurality of driving signals having different frequency components are output to the touch screen panel, and at least one of touch coordinates of a finger and touch coordinates of the stylus pen is determined based on a plurality of sensing signals received from the touch screen panel, so that the finger touch recognition and the pen touch recognition may be realized at the same time. Further, in order to sense the position of the stylus pen and the pressure of the stylus pen different from the frequency of the driving signal applied to the touch screen panel, the stylus pen is designed to be set to the frequency of the pen frequency signal and applied to the touch screen panel, so that a plurality of stylus pens may be used in one touch screen panel.

Moreover, the power consumption of the stylus pen may be reduced by controlling the output of the tip frequency signal outputted from the stylus pen when using the stylus pen and when not using the stylus pen.

BRIEF DESCRIPTION OF THE DRAWINGS

The above and other features and aspects of the present invention will become more apparent by describing in detailed exemplary embodiments thereof with reference to the accompanying drawings.

FIG. 17B is a waveform diagram explaining touch coordinate recognition through frequency spectrum analysis of a sensing signal by finger touch.

FIG. 18B is a waveform diagram explaining touch coordinate recognition through frequency spectrum analysis of a sensing signal by a stylus pen.

FIG. 19B is a waveform diagram explaining touch coordinate recognition through frequency spectrum analysis of a sensing signal by a finger and a stylus pen.

FIG. 25 is a waveform diagram explaining driving signals of the stylus pen shown in FIG. 23.

DETAILED DESCRIPTION OF THE INVENTION

Figure 1:
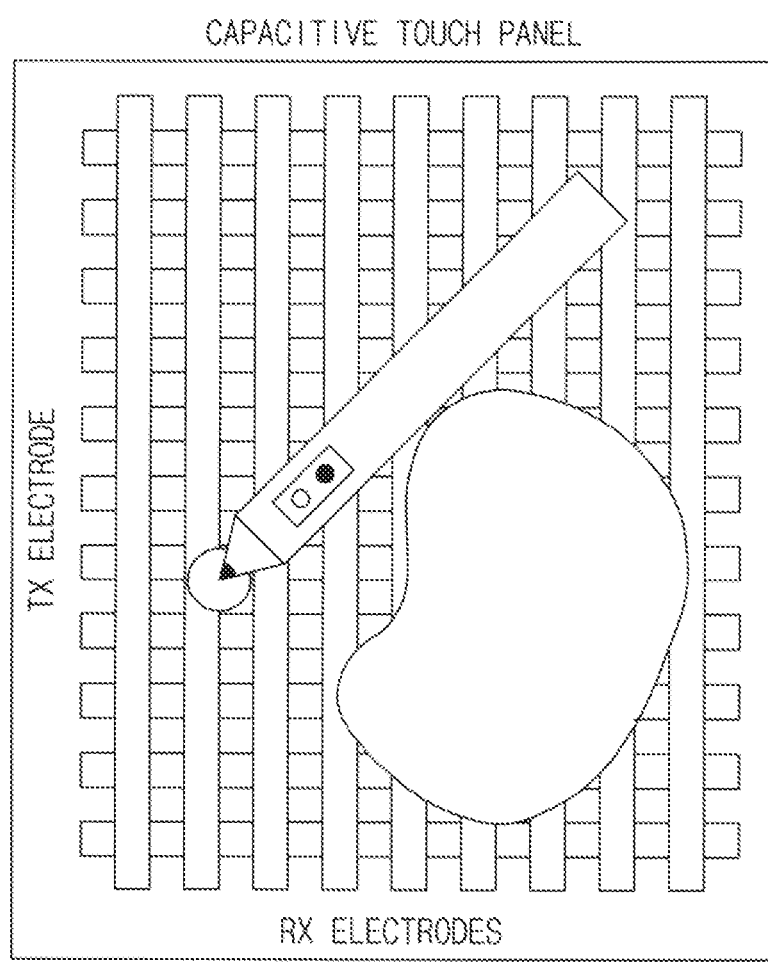
FIG. 1 is a schematic diagram explaining a palm touch generated on a touch screen panel by a conventional stylus pen.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "connected to" another element or layer, it can be directly on, connected or connected to the other element or layer or intervening elements or layers may be present. In contrast, when an element is referred to as being "directly on," "directly connected to" or "directly connected to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
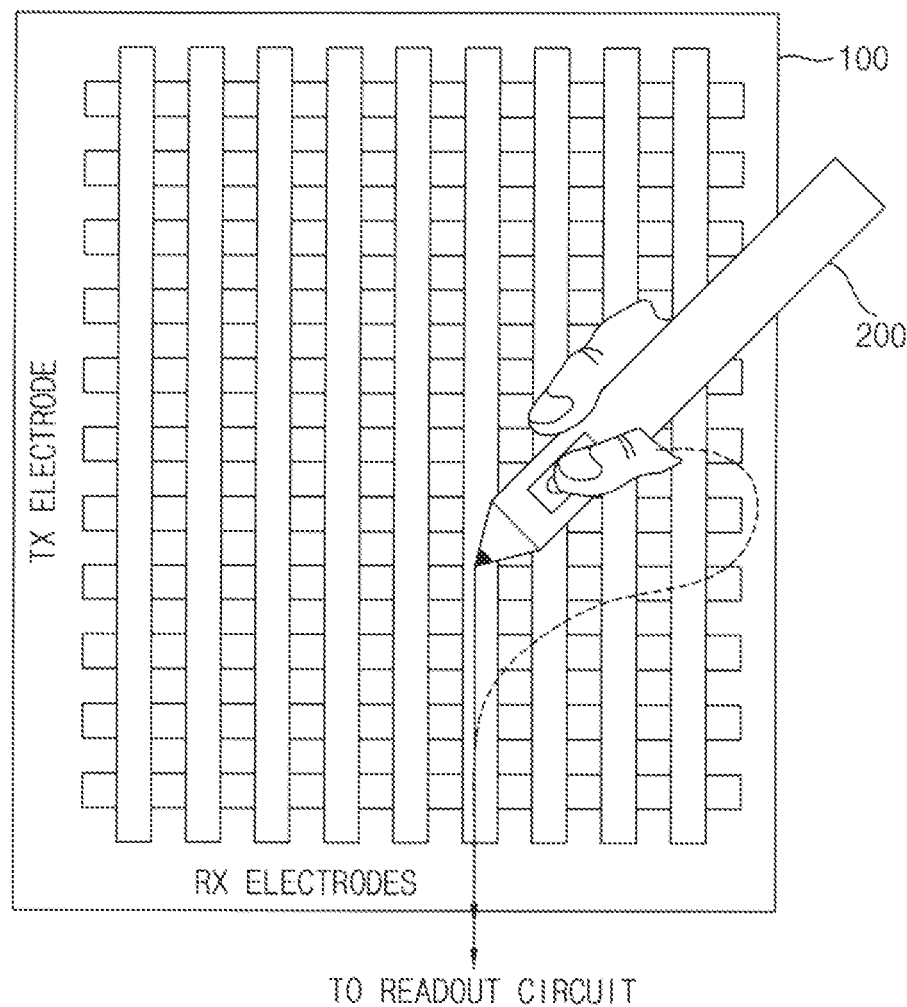
FIG. 2 is a schematic diagram explaining a palm rejection generated on a touch screen panel by a stylus pen according to the present invention.

FIG. 2 is a schematic diagram explaining a palm rejection generated on a touch screen panel 100 by a stylus pen 200 according to the present invention.

Referring to FIG. 2, a touch sensing system having a touch screen panel 100 using an electrostatic capacity method calculates the presence or absence of touch or touch coordinate by sensing the change of the capacitance when a human body or a conductive material contacts a touch sensor of the touch screen panel 100. In the touch screen panel 100 of FIG. 2, a plurality of TX electrodes is disposed on a lower layer, and a plurality of RX electrodes is disposed on an upper layer. However, a plurality of RX electrodes may be disposed on a lower layer, and the TX electrodes and the RX electrodes may be disposed on the same layer.

The capacitive touch screen panel 100 disclosed in the present exemplary embodiment of the present invention may be mounted on various products such as a sensing device sensing a touch position to be applicable. Touch screen type products are widely used in various fields of industry and are rapidly replacing button type devices due to their superior spatial characteristics. The most explosive demand is in the field of cell phones. In particular, in cell phones, convenience and the size of a terminal are very significant and thus, touch phones that do not include additional keys or minimize the number of keys have recently come into the spotlight. Thus, a sensing device having a capacitance type touch pattern according to the present invention mounted thereon may be employed in a cell phone and can also be widely used in a television (TV) including a touch screen, an asynchronous transfer mode (ATM) device that automatically serves cash withdrawal and remittance of a bank, an elevator, a ticket machine used in a subway, a portable multimedia player (PMP), an e-book, a navigation device, and the like. Besides, the touch display device replaces a general button type interface in all fields that require a user interface.

The touch sensing system according to the present invention calculates the touch coordinates by the stylus pen 200 using a sensing signal sensed when the stylus pen 200 approaches or touches the touch screen panel 100. To this end, in the touch sensing system according to the present invention, the stylus pen 200 supplies a pen driving signal to the touch screen panel 100. The pen driving signal is provided to a readout circuit (not shown) via a sensing line of the touch screen panel 100 to calculate touch coordinates. The pen driving signal may have a frequency for pen sensing f1.

Moreover, the stylus pen 200 outputs a palm rejection signal to a conductive pen case of the stylus pen 200. The palm rejection signal is provided to the touch screen panel 100 via the user's finger or palm. The palm rejection signal provided to the touch screen panel 100 is provided to a read-out circuit via a sensing line of the touch screen panel 100. The palm rejection signal may have a frequency for rejecting palm rejection f2.

When calculating touch coordinates, the read-out circuit calculates touch coordinates by ignoring a touch area corresponding to the palm rejection signal.

Of constituent elements of the stylus pen 200, a configuration for outputting the pen driving signal may be configured in various forms currently known.

A basic structure of the stylus pen 200 according to the present invention, that is, a structure for outputting the pen driving signal so that a touch may be sensed in the touch screen panel 100, may be configured in various forms currently known in addition to a structure of the stylus pen 200 disclosed in various publications.

Figure 3:
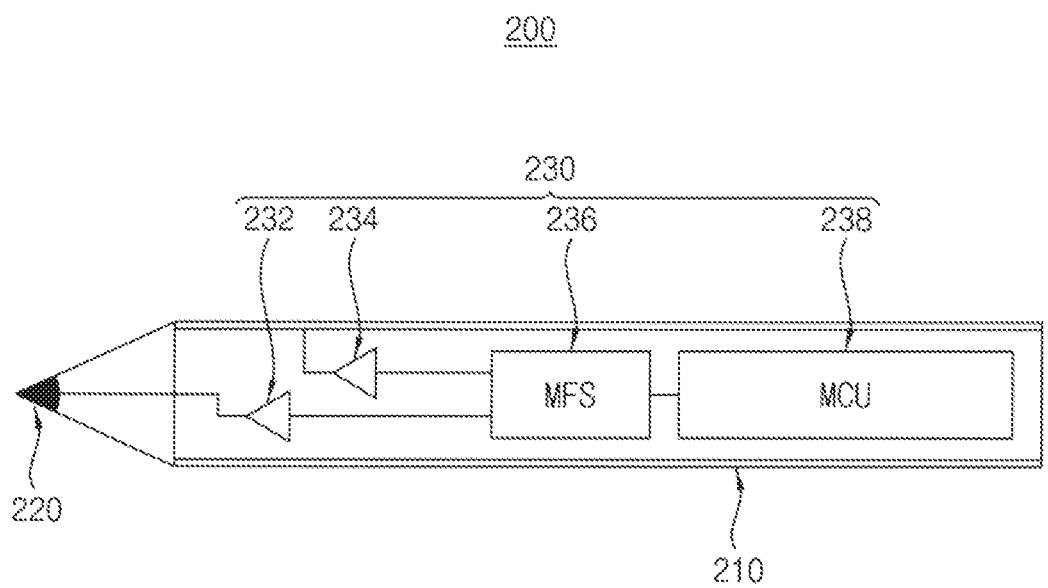
FIG. 3 is a configuration diagram schematically explaining a stylus pen according to an exemplary embodiment of the present invention.

FIG. 3 is a configuration diagram schematically explaining a stylus pen 200 according to an exemplary embodiment of the present invention.

Referring to FIG. 3, a stylus pen 200 according to an exemplary embodiment of the present invention includes a conductive pen case 210, a stylus tip 220 and a signal supply part 230. In FIG. 3, an illustration of the battery supplying the power of the stylus pen is omitted.

The conductive pen case 210 is formed of a conductive material as a whole or partially to have a rod shape. The stylus tip 220 is connected to a first terminal of the conductive pen case 210 in a protruding manner.

The stylus tip 220 is connected to a first terminal of the conductive pen case 210.

The signal supply part 230 provides a pen driving signal to the stylus tip 220 and provides a palm print signal to the conductive pen case 210. The pen driving signal and the palm rejection signal may be simultaneously output. The pen driving signal is changed to a sensing signal and then supplied to an external read-out circuit (not shown). The read-out circuit may be mounted on a touch screen panel (not shown). The palm rejection signal is provided to the read-out circuit via the user's hand and the touch screen panel. The read-out circuit calculates touch coordinates of the stylus pen 220 based on the sensing signal, and ignores the touch caused by the palm rejection signal.

In the present exemplary embodiment, the pen driving signal and the palm rejection signal may have different frequencies. For example, when the pen driving signal has a first frequency and the palm rejection signal has a second frequency, the signal supply part 230 may include a first buffer 232, a second buffer 234, a multi-frequency output part 236 and a main control unit 238.

The first buffer 232 is connected between the multi-frequency output part 236 and the stylus tip 220.

The second buffer 234 is connected between the multi-frequency output part 236 and the conductive pen case 210.

The multi-frequency output part 236 outputs a pen driving signal having a first frequency to the first buffer 232, and outputs a palm rejection signal having a second frequency to the second buffer 234. Thus, the pen driving signal of the first frequency is provided to the stylus tip 220, and the palm rejection signal of the second frequency is provided to the conductive pen case 210.

The main control unit 238 is disposed in the conductive pen case 210. The main control unit 238 controls the multi-frequency output part 236 by determining the first frequency and the second frequency.

Meanwhile, the pen driving signal and the palm rejection signal may have different amplitudes. Since the pen driving signal and the palm rejection signal may be distinguished from each other by their amplitudes, the read-out circuit may ignore a touch area corresponding to the palm rejection signal and calculate touch coordinates when calculating the touch coordinates.

Meanwhile, the pen driving signal and the palm rejection signal may have different phases. Since the pen driving signal and the palm rejection signal may be distinguished from each other by their phase, the read-out circuit may ignore a touch area corresponding to the palm rejection signal and calculate touch coordinates when calculating the touch coordinates.

In operation, the signal supply part 230 generates a pen driving signal and a palm rejection signal. The pen driving signal and the palm rejection signal may be generated to have different frequencies in the multi-frequency output part 236. The different frequencies may be determined by the main control unit 238.

Then, the signal supply part 230 applies the pen driving signal to the stylus tip, and applies the palm rejection signal to the conductive pen case. The pen driving signal may be applied via the first buffer 232, and the palm rejection signal may be applied via the second buffer 234.

Then, a read-out circuit that may be disposed on a touch screen panel senses a sensing signal induced in a driving line that transmits the pen driving signal and the palm rejection signal through a sensing line. The driving line or the sensing line may be disposed on the touch screen panel.

Then, the read-out circuit classifies a first signal corresponding to the pen driving signal and a second signal corresponding to the palm rejection signal in the sensing signal.

Then, the read-out circuit ignores the touch caused by the second signal and calculates touch coordinates based on the first signal.

Figure 4:
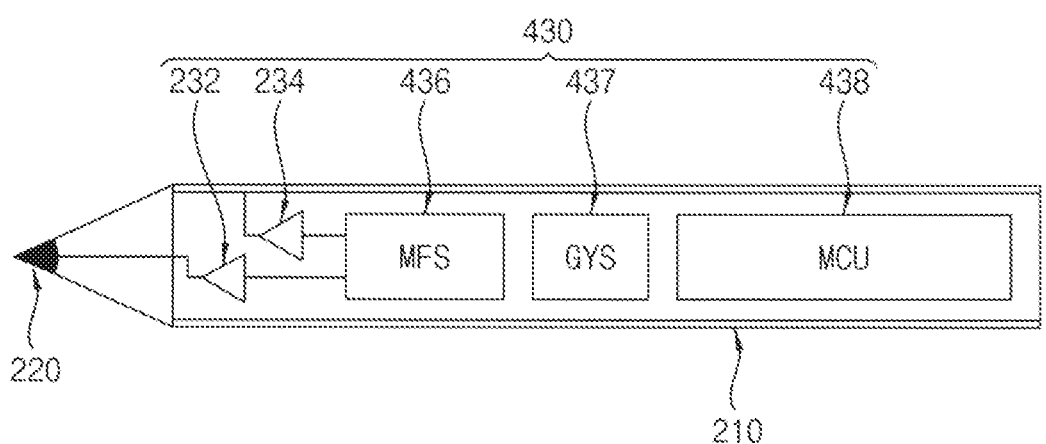
FIG. 4 is a configuration diagram schematically explaining a stylus pen according to an exemplary embodiment of the present invention.

FIG. 4 is a configuration diagram schematically explaining a stylus pen according to an exemplary embodiment of the present invention.

Referring to FIG. 4, a stylus pen 400 according to an exemplary embodiment of the present invention includes a conductive pen case 210, a stylus tip 220 and a signal supply part 430. The illustration of a battery supplying the power to the stylus pen is omitted in FIG. 4.

The conductive pen case 210 and the stylus tip 220 are shown in FIG. 3, and thus any repetitive detailed explanation will hereinafter be omitted.

The signal supply part 430 provides a pen driving signal to the stylus tip 220 and provides a palm print signal to the conductive pen case 210. The pen driving signal and the palm rejection signal may be simultaneously output. The pen driving signal is changed to a sensing signal and then supplied to an external read-out circuit (not shown). The read-out circuit may be mounted on a touch screen panel (not shown). The palm rejection signal is provided to the read-out circuit via the user's hand and the touch screen panel. The read-out circuit calculates touch coordinates based on the sensing signal, and ignores the touch caused by the palm rejection signal.

In the present exemplary embodiment, the pen driving signal and the palm rejection signal may have different frequencies. For example, when the pen driving signal has a first frequency and the palm rejection signal has a second frequency, the signal supply part 430 may include a first buffer 232, a second buffer 234, a multi-frequency output part 436, a gyro sensor 437 and a main control unit 438.

The first buffer 232 is connected between the multi-frequency output part 436 and the stylus tip 220.

The second buffer 234 is connected between the multi-frequency output part 436 and the conductive pen case 210.

The multi-frequency output part 436 outputs the pen driving signal having the first frequency to the first buffer 232 and outputs the palm rejection signal having the second frequency to the second buffer 234. Accordingly, the pen driving signal of the first frequency is supplied to the stylus tip 220, and the palm rejection signal of the second frequency is supplied to the conductive pen case 210.

The gyro sensor 437 is disposed in the conductive pen case 210 to sense rotation or tilting of the stylus pen 400, for example, tilt up moving an up direction, tilt down moving a down direction, tilting amount or the like.

The main control unit 438 is disposed within the conductive pen case 210 to control the multi-frequency output part 436 by determining the first frequency and the second frequency.

For one example, the pen driving signal and the palm rejection signal may have different amplitudes. For another example, the pen driving signal and the palm rejection signal may have different phases.

Figure 5:
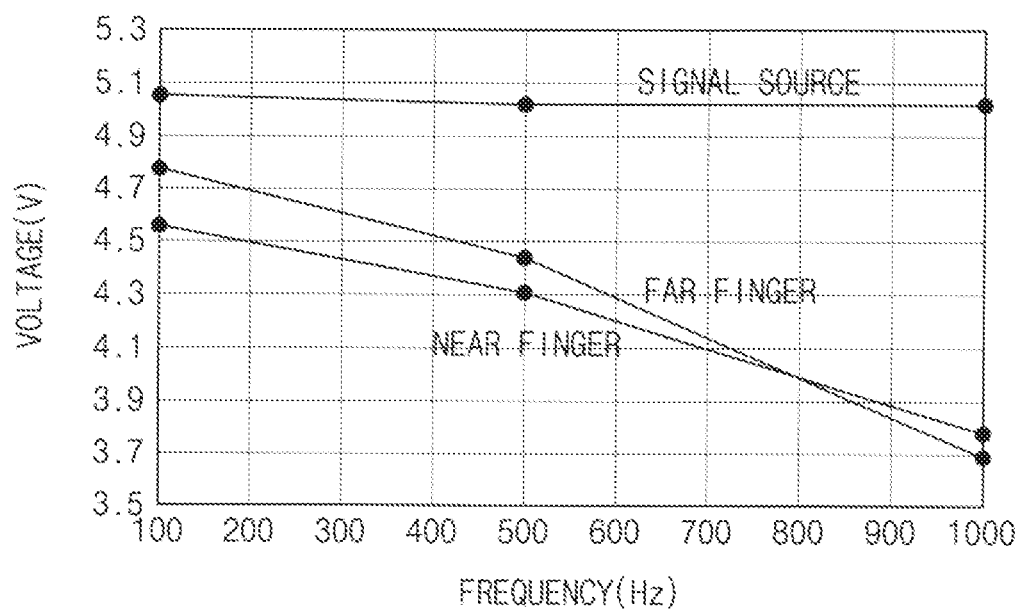
FIG. 5 is a frequency versus voltage curve explaining characteristics of signals on a touch screen panel.

FIG. 5 is a frequency versus voltage curve explaining characteristics of signals on a touch screen panel.

Referring to FIG. 5, when a driving frequency having a frequency of about 100 Hz and an amplitude of about 5.1 volts is output from a stylus pen, a signal sensed at a finger near the stylus pen has a frequency of about 100 Hz and an amplitude of about 4.52 volts, and a signal sensed at a finger far from the stylus pen has a frequency of about 100 Hz and an amplitude of about 4.8 volts.

Meanwhile, when a driving frequency having a frequency of about 500 Hz and an amplitude of about 5.1 volts is output from a stylus pen, a signal sensed at a finger near the stylus pen has a frequency of about 500 Hz and an amplitude of about 4.3 volts, and a signal sensed at a finger far from the stylus pen has a frequency of about 500 Hz and an amplitude of about 4.45 volts.

Meanwhile, when a driving frequency having a frequency of about 1000 Hz and an amplitude of about 5.1 volts is output from a stylus pen, a signal sensed at a finger near the stylus pen has a frequency of 1000 Hz and an amplitude of about 3.8 volts, and a signals sensed at the finger far from the stylus pen has a frequency of about 1000 Hz and an amplitude of about 3.7 volts.

That is, it may be seen from FIG. 5 that a driving frequency generated in the pen is capable of sensing for corresponding frequency/phase in a finger near or far from the pen. Although there is attenuation of the amplitude due to an impedance of the body, it may be distinguished in the read-out circuit because it is damped as a whole.

Figure 6:
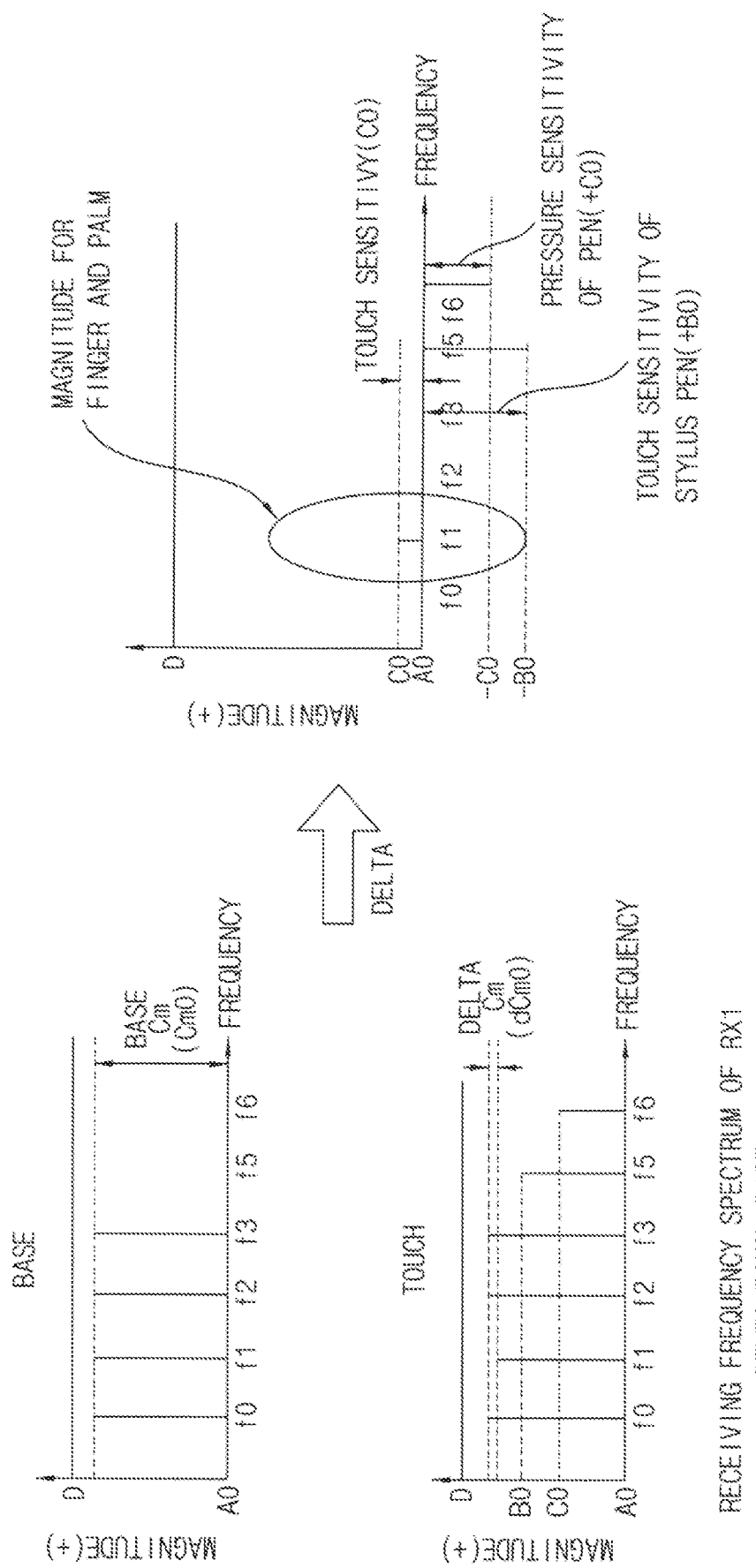
FIG. 6 is frequency spectrums explaining frequency extraction corresponding to the palm area.

FIG. 6 is frequency spectrums explaining frequency extraction corresponding to the palm area.

Referring to FIG. 6, in a state where a stylus pen is not used (that is, a base state), signals having frequencies f0, f1, f2, f3 and f4 are sensed on a touch screen panel.

Meanwhile, in the case where the stylus pen is used and a state in which an unintended touch area is sensed, signals having frequencies f0, f1, f2, f3, f4, f5 and f6 are sensed in the touch screen panel. At this time, the magnitude of the signal having the frequency f1 sensed when the stylus pen is used is smaller than the magnitude of the signals having the frequency f1 sensed when the stylus pen is not used.

Furthermore, when a stylus pen is used, signals having frequencies of f5 and f6 are further sensed as compared with the case where the stylus pen is not used.

Subtracting a frequency spectrum of the state in which the stylus pen is used in a frequency spectrum without the stylus pen, it may be seen that a positive f1 frequency, a negative f5 frequency and a negative f6 frequency remain. Here, a signal having a positive f1 frequency is a palm rejection signal sensed via a finger and a palm, and a signal having a negative f5 frequency and a signal having a negative f6 frequency are pen driving signals according to use of the stylus pen. In particular, a signal having a negative f5 frequency is a signal corresponding to the touch sensitivity of the stylus pen, and a signal having a negative f6 frequency may be a pressure signal of the stylus pen.

Figure 7:
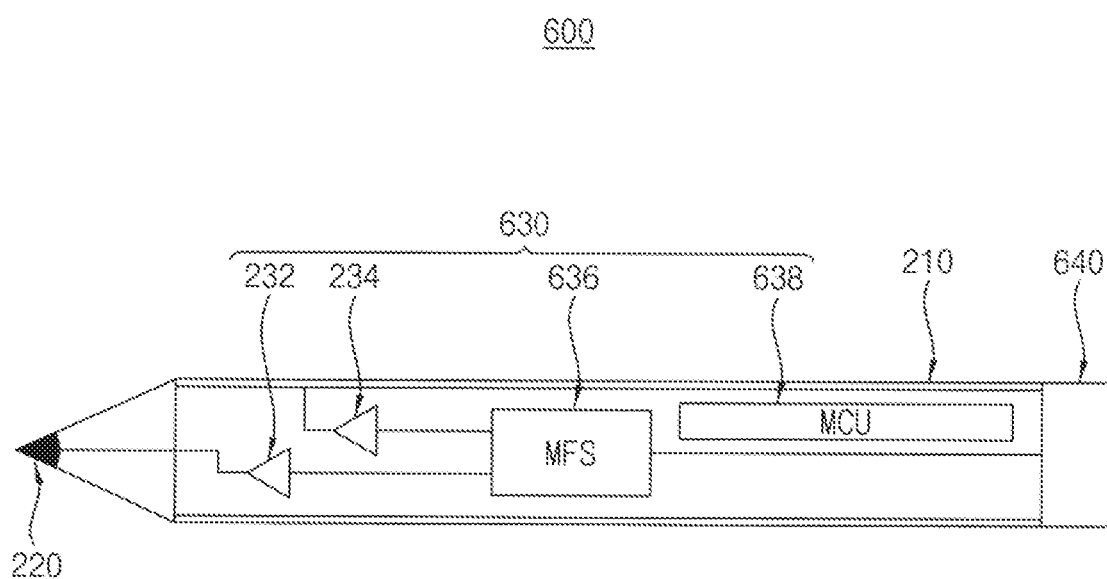
FIG. 7 is a configuration diagram schematically explaining a stylus pen according to an exemplary embodiment of the present invention.

FIG. 7 is a configuration diagram schematically explaining a stylus pen according to an exemplary embodiment of the present invention.

Referring to FIG. 7, a stylus pen according to an exemplary embodiment of the present invention includes a conductive pen case 210, a stylus tip 220, a signal supply part 630 and an erasing member 640. In FIG. 7, an illustration of the battery supplying the power of the stylus pen is omitted.

The conductive pen case 210 and the stylus tip 220 are shown in FIG. 3, and thus any repetitive detailed explanation will hereinafter be omitted.

The signal supply part 630 provides a pen driving signal to the stylus tip 220 and provides a palm print signal to the conductive pen case 210. The pen driving signal and the palm rejection signal may be simultaneously output. The pen driving signal is changed to a sensing signal and then supplied to an external read-out circuit (not shown). The read-out circuit may be mounted on a touch screen panel (not shown). The palm rejection signal is provided to the read-out circuit via the user's hand and the touch screen panel. The read-out circuit calculates touch coordinates based on the sensing signal, and ignores the touch caused by the palm rejection signal.

In the present exemplary embodiment, the pen driving signal and the palm rejection signal may have different frequencies. For example, when the pen driving signal has a first frequency and the palm rejection signal has a second frequency, the signal supply part 630 may include a first buffer 232, a second buffer 234, a multi-frequency output part 636 and a main control unit 638.

The first buffer 232 is connected between the multi-frequency output part 636 and the stylus tip 220.

The second buffer 234 is connected between the multi-frequency output part 636 and the conductive pen case 210.

The multi-frequency output part 636 outputs the pen driving signal having the first frequency to the first buffer 232, and outputs the palm rejection signal having the second frequency to the second buffer 234.

When a tilt signal of a pen is sensed, the signal supply part 630 applies a signal different from the pen driving signal to the stylus tip 220. The tilt signal of the pen described above may be sensed in various ways. As an example, it may be sensed based on an operation of a button disposed in a partial area of the conductive pen case 210. For example, in the case of handwriting, the tilt signal of the pen is not sensed when the handwriting is performed while the user presses the button through the finger. However, when the button is not pressed, the tilt signal may be sensed.

The erasing member 640 is disposed in a direction opposite to the stylus tip 220. When the tilt signal of the pen is sensed, the signal supply part 630 may apply a third signal to the erasing member 640.

Accordingly, when the third signal applied to the erasing member 640 is sensed in the touch screen panel, an area corresponding to the third signal may be erased.

Figure 8:
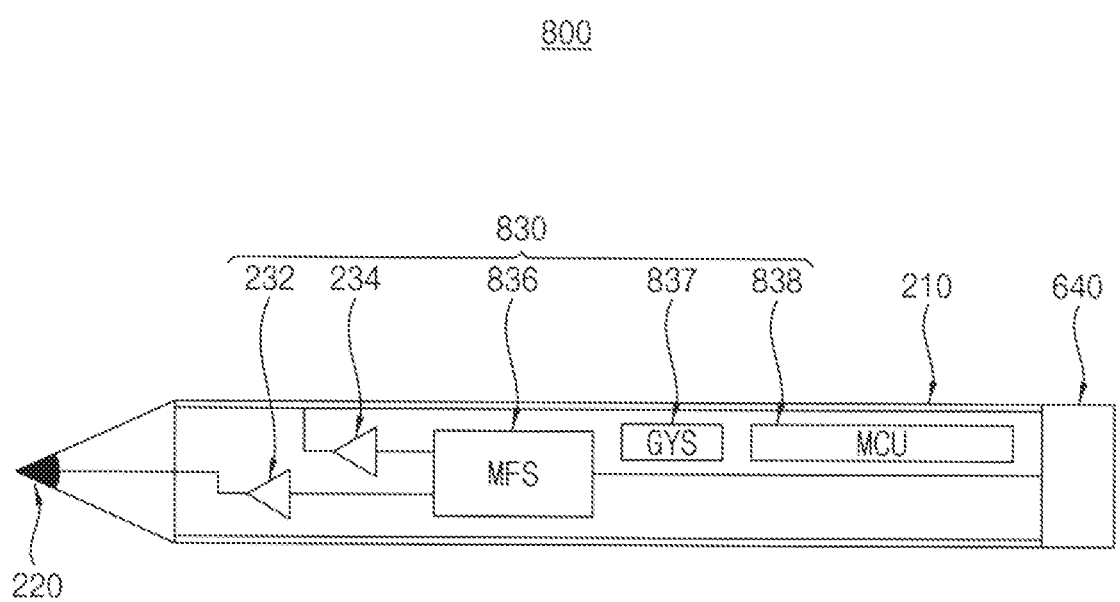
FIG. 8 is a configuration diagram schematically explaining a stylus pen according to an exemplary embodiment of the present invention.

FIG. 8 is a configuration diagram schematically explaining a stylus pen according to an exemplary embodiment of the present invention.

Referring to FIG. 8, a stylus pen 800 according to an exemplary embodiment of the present invention includes a conductive pen case 210, a stylus tip 220, a signal supply part 830 and an erasing member 640. In FIG. 8, an illustration of the battery supplying the power of the stylus pen is omitted.

The conductive pen case 210 and the stylus tip 220 are shown in FIG. 3, and thus any repetitive detailed explanation will hereinafter be omitted.

The signal supply part 830 provides a pen driving signal to the stylus tip 220 and provides a palm print signal to the conductive pen case 210. The pen driving signal and the palm rejection signal may be simultaneously output. The pen driving signal is changed to a sensing signal and then supplied to an external read-out circuit (not shown). The read-out circuit may be mounted on a touch screen panel (not shown). The palm rejection signal is provided to the read-out circuit via the user's hand and the touch screen panel. The read-out circuit calculates touch coordinates based on the sensing signal, and ignores the touch caused by the palm rejection signal.

In the present exemplary embodiment, the pen driving signal and the palm rejection signal may have different frequencies. For example, when the pen driving signal has a first frequency and the palm rejection signal has a second frequency, the signal supply 830 may include a first buffer 232, a second buffer 234, a multi-frequency output part 836, a gyro sensor 837 and a main control unit 838.

The first buffer 232 is connected between the multi-frequency output part 836 and the stylus tip 220.

The second buffer 234 is connected between the multi-frequency output part 836 and the conductive pen case 234.

The multi-frequency output part 836 outputs the pen driving signal having the first frequency to the first buffer 232 and outputs the rejection signal having the second frequency to the second buffer 234.

The gyro sensor 837 is disposed in the conductive pen case 210 to sense rotation or tilting of the stylus pen 400, for example, tilt up moving an up direction, tilt down moving a down direction, tilting amount or the like.

When a tilt signal of a pen is sensed by the gyro sensor 837, the signal supply part 830 applies a signal different from the pen driving signal to the stylus tip 220.

The erasing member 640 is disposed in an opposite direction to the stylus tip 220. When the tilt signal of the pen is sensed by the gyro sensor 837, the signal supply part 830 may apply a third signal to the erasing member 640.

Accordingly, when the third signal applied to the erasing member 640 is sensed in the touch screen panel, an area corresponding to the third signal may be erased.

As described above, according to the present invention, a palm rejection signal different from the pen driving signal applied to the stylus tip is applied to the conductive pen case. The palm rejection signal is provided to the touch screen panel via the user's hand. In the lead-out circuit, a first signal corresponding to the pen driving signal and a second signal corresponding to the palm rejection signal are classified in a sensing signal sensed through a sensing line. The palm rejection function can be achieved by calculating the touch coordinates based on the first signal while ignoring the touch caused by the second signal when calculating the touch coordinates.

Figure 9:
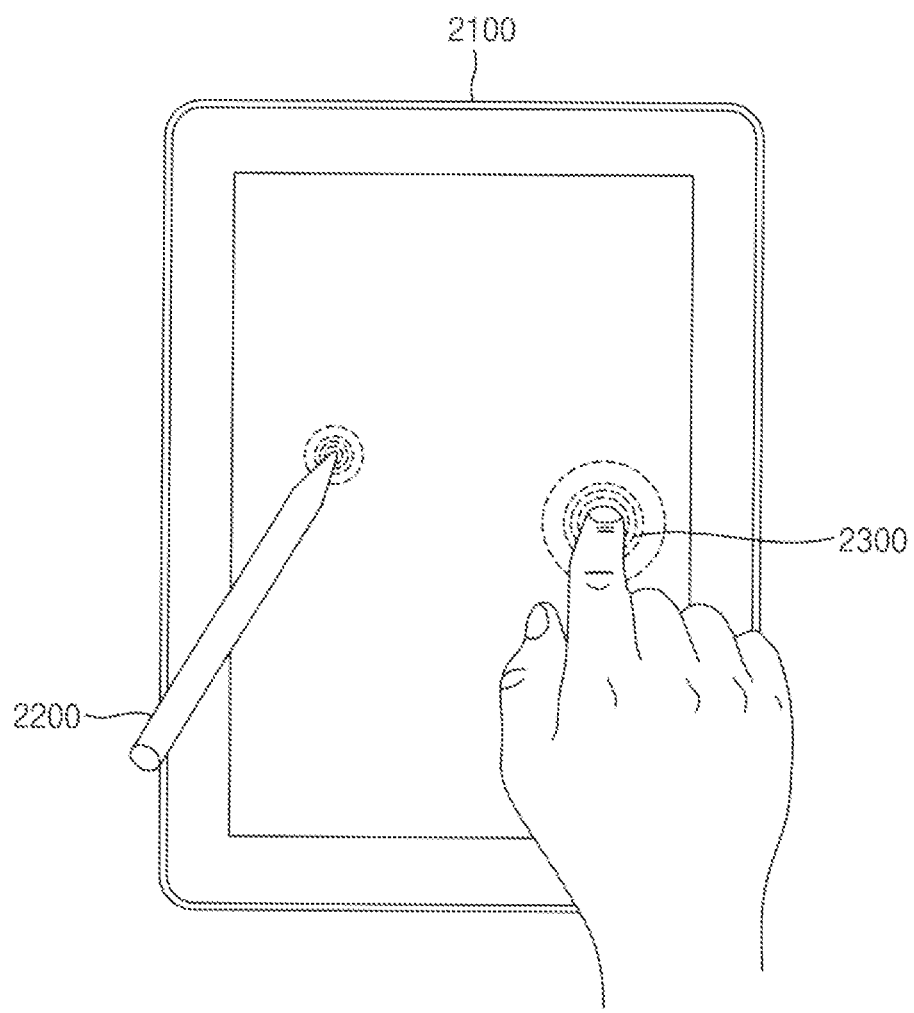
FIG. 9 is a schematic diagram explaining a touch sensing system according to an exemplary embodiment of the present invention.

FIG. 9 is a schematic diagram explaining a touch sensing system according to an exemplary embodiment of the present invention. In particular, it is a schematic diagram explaining the simultaneous use of a stylus pen and a finger on a touch screen panel.

Referring to FIG. 9, a touch sensing system includes a touch sensing device 2100 and a stylus pen 2200 to recognize a touch operation of a finger 2300 by the user or a touch operation of the stylus pen 2200. The touch sensing device 2100 senses a position of the finger 2300 of the user to determine a touch coordinates of the finger 2300 or senses a position of the stylus pen 2200 to determine a touch coordinates of the stylus pen 2200. A touch coordinates of the finger 2300 and a touch coordinates of the stylus pen 2200 may be sensed at the same time.

Figure 10:
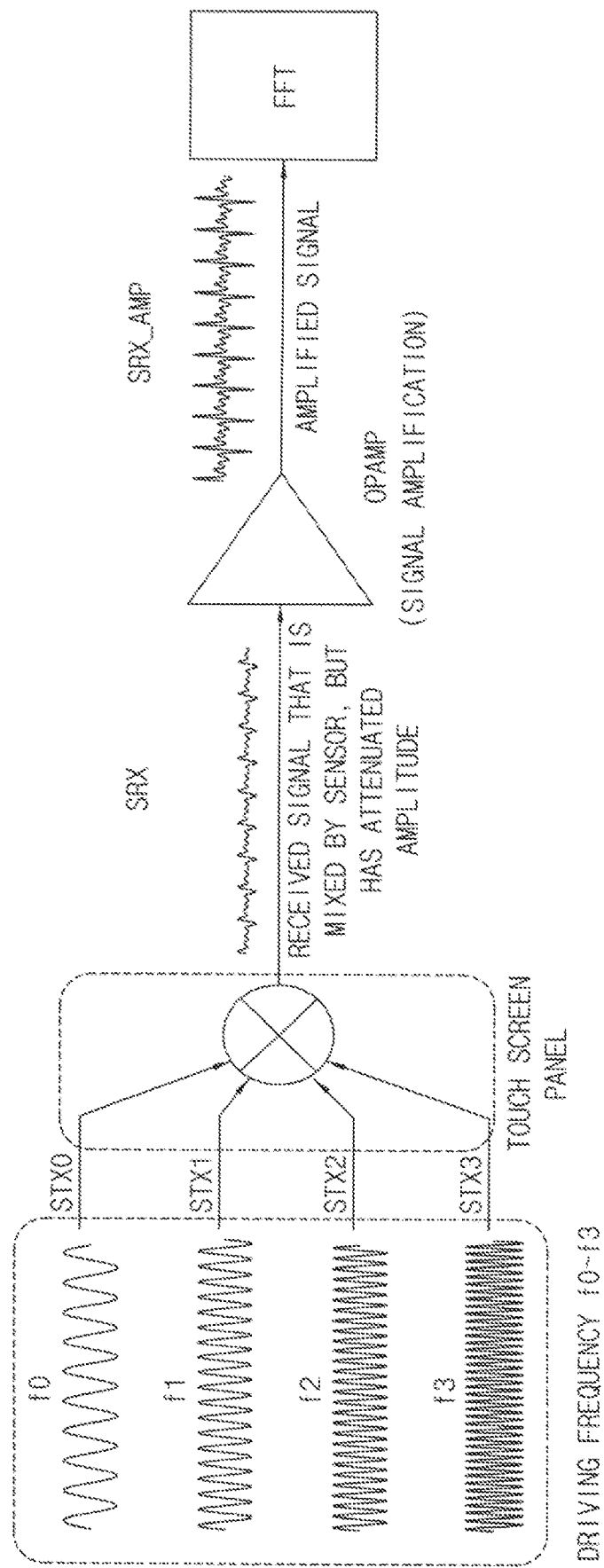
FIG. 10 is a configuration diagram explaining a touch coordinate determination by the touch sensing apparatus shown in FIG. 9.

FIG. 10 is a configuration diagram explaining a touch coordinate determination by the touch sensing apparatus shown in FIG. 9.

Referring to FIG. 9 and FIG. 10, a plurality of driving signals is applied to different driving electrodes provided on a touch screen panel. Each of the driving signals has different frequency components. Hereinafter, for convenience of explanation, it is described that a first driving signal STX0, a second driving signal STX1, a third driving signal STX2 and a fourth driving signal STX3 are applied to the touch screen panel. Therefore, the first driving signal STX0 has a first frequency component f0, the second driving signal STX1 has a second frequency component f1, and the third driving signal STX2 has a third frequency component f2, and the fourth driving signal STX3 has a fourth frequency component f3. Each of the first to fourth frequency components f0, f1, f2 and f3 is different from each other.

A sensing electrode RX of the touch screen panel receives sensing signal SRX sensed corresponding to the first to fourth driving signals STX0, STX1, STX2 and STX3. The sensing signal is mixed by the touch screen panel; however an amplitude of the sensing signal SRX is decreased in comparison to the driving signals STX0, STX1, STX2 and STX3.

The sensing signal SRX is amplified by an amplifier and then supplied to an FFT processing block. The FFT processed sensing signals are disassembled and interpreted to derive coordinates of where the touch occurred. The amplifier or the FFT processing block may be provided in a touch sensing controller provided in the touch sensing device 2100.

Figure 11A:
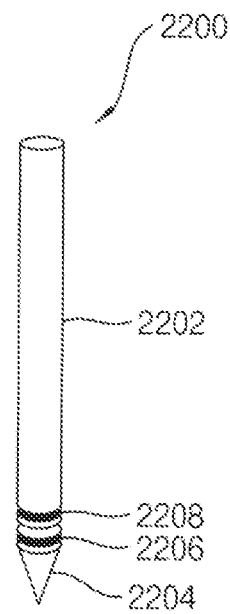
FIG. 11A is a schematic diagram explaining an appearance of the stylus pen shown in FIG. 9.
Figure 11B:
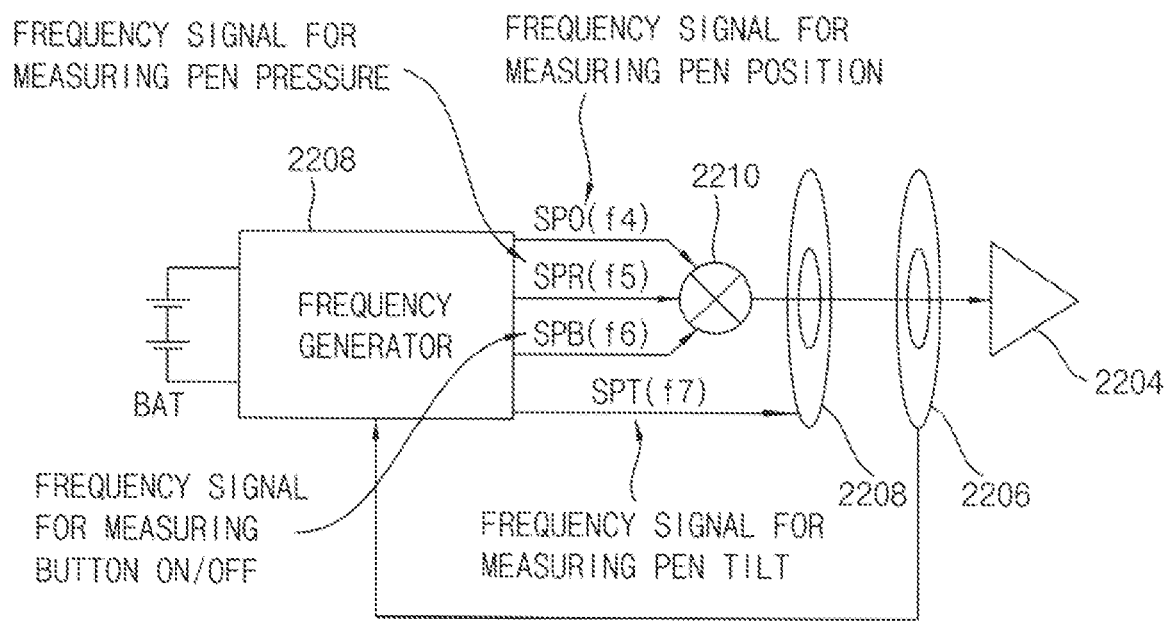
FIG. 11B is a configuration diagram schematically explaining the stylus pen shown in FIG. 9.

FIG. 11A is a schematic diagram explaining an appearance of the stylus pen shown in FIG. 9, and FIG. 11B is a configuration diagram schematically explaining the stylus pen shown in FIG. 9.

Referring to FIG. 11A and FIG. 11B, a stylus pen 2200 includes a pencil-shaped conductive case 2202, a tip electrode 2204 connected to one side of the conductive case 2202, a pen pressure sensor 2206 disposed between the conductive case 2202 and the tip electrode 2204, a frequency signal generator 2208, a mixer 2210 and a ring electrode 2209 spaced apart from the pen pressure sensor 2206 by a predetermined distance. In the present exemplary embodiment, although the pressure sensor 2206 is illustrated as being closer to the tip electrode 2204 than the ring electrode 2209, the ring electrode 2209 may be positioned closer to the tip electrode 2204 than the pressure sensor 2206.

The tip electrode 2204 has a shape that can be brought into contact with the touch screen panel.

The pen pressure sensor 2206 measures a pressure of the tip electrode 2204 applied to the touch screen panel and outputs a pressure signal. That is, the pen pressure sensor 2206 generates an electric signal in accordance with a pressure applied to the tip electrode 2204 protruding from an end portion of a stylus pen body. For example, the pen pressure sensor 2206 generates an electrical signal in accordance with a pressure applied to the tip electrode 2204 by a user's writing operation. The tip electrode 2204 may be connected to the pen pressure sensor 2206 to transmit a pressure generated by the tip electrode 2204 to the pen pressure sensor 2206.

The frequency signal generator 2208 generates a position sensing signal SPO that is set to sense the position of the stylus pen 2200, a pressure sense signal SPO that is set to measure a pressure of the stylus pen based on the pressure sensing signal SPR, and a button sensing signal SPB set to measure the button on/off of the stylus pen. Moreover, the frequency signal generator 2208 generates a tilt sensing signal SPT for sensing the tilt of the stylus pen. In the present exemplary embodiment, a tilt angle of the stylus pen with respect to a touch screen panel may be sensed based on the tilt sensing signal SPT. The tilt angle of the stylus pen may be utilized for the thickness of a line drawn by the stylus pen 2200 on the touch screen panel.

Hereinafter, for convenience of description, an example in which four driving electrodes and four sensing electrodes are disposed in the touch screen panel will be described. At this time, the first driving signal STX0, the second driving signal STX1, the third driving signal STX2, and the fourth driving signal STX3 are applied to the driving electrodes. Accordingly, the first driving signal STX0 has the first frequency component f0, the second driving signal STX1 has the second frequency component f1, and the third driving signal STX2 has the second frequency component f1. A third frequency component f2, and the fourth drive signal STX3 has a fourth frequency component f3. Each of the first to fourth frequency components f0, f1, f2 and f3 is different from each other. The position sensing signal SPO has a fifth frequency component f4 and the pressure sensing signal SPR has a sixth frequency component f5 and the button sensing signal SPB has a seventh frequency component f4. (f6), and the tilt sensing signal SPT has an eighth frequency component (f7). Here, the fifth frequency component f4 of the position sensing signal SPO, the sixth frequency component f5 of the pressure sensing signal SPR, the seventh frequency component f6 of the button sensing signal SPB, The eighth frequency component f7 of the tilt sensing signal SPT is different from each of the first to fourth frequency components f0, f1, f2 and f3.

The mixer 2210 mixes the position sensing signal SPO, the pressure sensing signal SPR and the button sensing signal SPB to output a mixing signal to the tip electrode 2204. The tilt sensing signal SPT is output to the ring electrode 2209.

As described above, in order to sense the position of the stylus pen and the pressure of the stylus pen, the frequency of the pen frequency signal, which is set differently from the frequency of the driving signal, applied to the touch screen panel, so that a plurality of stylus pens may be used in one touch screen panel.

Figure 12A:
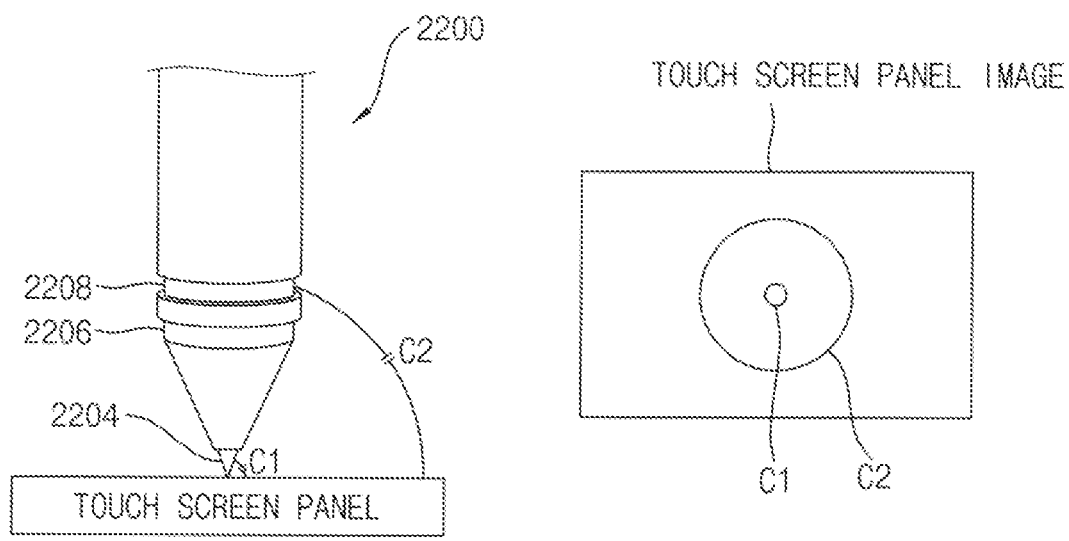
FIG. 12A and FIG. 12B are diagrams explaining each of the directions of the stylus pen as the stylus pen shown in FIG. 11A touches the touch screen panel.
Figure 12B:
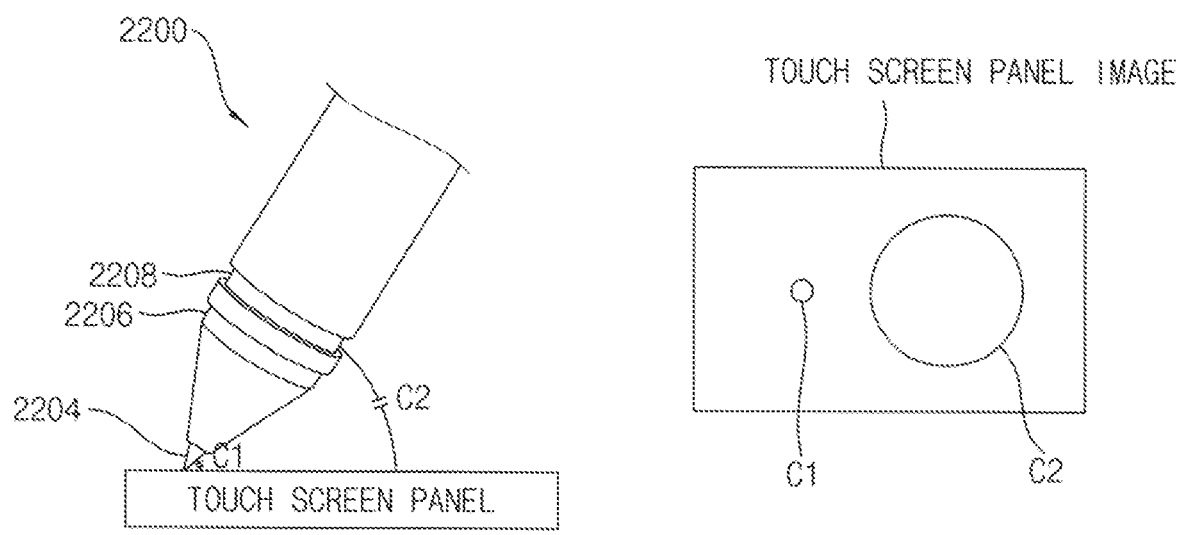

FIG. 12A and FIG. 12B are diagrams explaining each of the directions of the stylus pen as the stylus pen shown in FIG. 11A touches the touch screen panel.

In FIG. 12A, the stylus pen 2200 may have a perpendicular direction when touching the touch screen panel. As the stylus pen 2200 touches the touch screen panel, the tip electrode 2204 and a conductor component (i.e., the rows and/or columns of the touch screen panel) near the tip electrode 2204 may form a tip capacitance C1. Similarly, the ring electrode 2206 and a conductor component (i.e., the rows and/or columns of the touch screen panel) near the ring electrode 2206 may form may form a ring capacitances C2. The image captured on the touch screen panel may show a touch or roaming image resulting from the tip and ring capacitances C1 and C2. Since the stylus pen 2200 is perpendicular to the touch screen panel, an image may show an image corresponding to the tip capacitance C1 surrounded by an image corresponding to the ring capacitance C2.

In FIG. 12B, the stylus pen 2200 may have a tilted direction when touching the touch screen panel. As a result, the image captured on the touch screen panel may show a roaming images resulting from shifts or two capacitances C1 and C2 at the touch position. Here, an image corresponding to the ring capacitance C2 is shifted to the right side of an image corresponding to the tip capacitance C1. The amount of shift may correspond to the amount of tilt of the stylus pen 2200. For example, when the tilt is large (i.e., the tilt angle with respect to the normal of the touch screen panel is large), an image corresponding to the ring capacitance C2 is further away from the image corresponding to the tip capacitance C1. Conversely, when the tilt becomes small (i.e., the tilt angle with respect to the normal of the touch screen panel becomes small), an image corresponding to the ring capacitance C2 approaches or overlaps an image corresponding to the tip capacitance C1. Thus, by determining a proximity of the image corresponding to the two capacitances C1 and C2 in the captured image, the amount of tilt of the stylus pen 2200 may be determined.

The above-described image may be used to determine the oblique direction of the stylus pen 2200, for example, upward, downward, rightward, leftward, and the like. For example, in the image of FIG. 12B, the image corresponding to the ring capacitance C2 exists to the right of the image corresponding to the tip capacitance C1. This may mean that the stylus pen 2200 is tilted to the right. When an image corresponding to the ring capacitance C2 is present on the left side of the image corresponding to the tip capacitance C1, this may mean that the stylus pen 2200 is tilted to the left. When the image corresponding to the ring capacitance C2 is above the image corresponding to the tip capacitance C1, this may mean that the stylus pen 2200 is tilted upwards. When an image corresponding to the ring capacitance C2 is present below the image corresponding to the tip capacitance C1, this may mean that the stylus pen 2200 is tilted downward. Other oblique directions, e.g., upper left, lower right, etc., may also be determined according to the relative positions of the image corresponding to the tip and ring capacitances C1 and C2.

By determining a proximity between a tip and ring capacitances C1 and C2 on an image and their relative positions, a direction of a stylus pen may be sensed.

Figure 13:
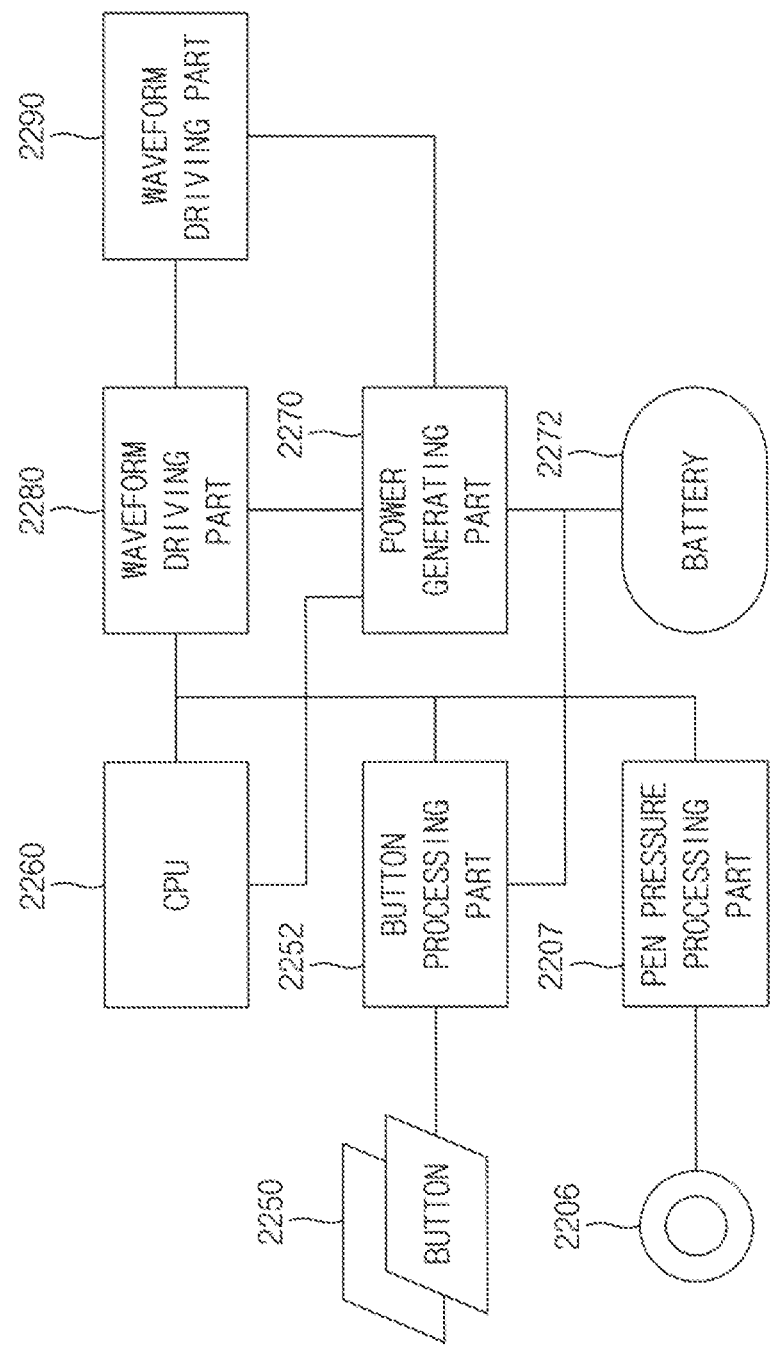
FIG. 13 is a block diagram explaining the stylus pen shown in FIG. 9.

FIG. 13 is a block diagram explaining the stylus pen 2200 shown in FIG. 9.

Referring to FIG. 13, the stylus pen 2200 includes buttons 2250, a button processing part 2252, a pen control part 2260, a pen pressure sensor 2206, a pen pressure processing part 2207, a pen control part 2260, a power managing part 2270, a battery 2272, a waveform generating part 2280 and a waveform driving part 2290.

The buttons 2250 are varied according to a user's operation to provide a button signal to the button processing part 2252. The buttons 2250 may be mechanical buttons or electrostatic buttons. The buttons 2250 may provide additional functionality including "left click" and "right click" functions similar to those of a computer mouse but not limited thereto. The buttons 2250 of the stylus pen 2200 may be coupled to a pen control part (CPU) 2260. The buttons 2250 may be mechanical, electrical, capacitive, or other types known to those skilled in the art.

The button processing part 2252 converts a button signal provided from the buttons 2250 into a digital signal and provides the digital signal to the pen control part 2260.

The pen pressure sensor 2206 senses a pressure applied to the touch screen panel by the stylus pen 2200 and provides a sensed pressure signal to the pen pressure processing part 2207.

The pen pressure processing part 2207 provides a pressure signal provided from the pen pressure sensor 2206 to the waveform driving part 2280.

The pen control part 2260 may control an operation of the components provided in the stylus pen 2200.

The power managing part 2270 supplies the power of the battery 2272 to the respective components. The power supply is boosted as needed, and the boosted power supply is supplied to the respective components. Conventionally, a stylus pen may be classified into an active type and a passive type according to the presence or absence of a battery. According to the present invention, since the battery 2272 is provided in the stylus pen 2200, the stylus pen according to the present invention is an active stylus pen.

The waveform generating part 2280 provides the waveform driving part 2290 with a first waveform for generating a position sensing signal SPO or a second waveform for generating a pressure sensing signal SPR in response to a control of the pen control part 2260. The first waveform or the second waveform may be a sinusoidal wave.

The waveform driving part 2290 amplifies the first waveform or the second waveform generated by the waveform generating part 2280, mixes the amplified waveforms, and outputs a mixed signal. In the present exemplary embodiment, a pen pressure processing part 2207, a waveform generating part 2280 and a waveform driving part 2290 may define the frequency signal generator 2208 shown in FIG. 11.

Figure 14:
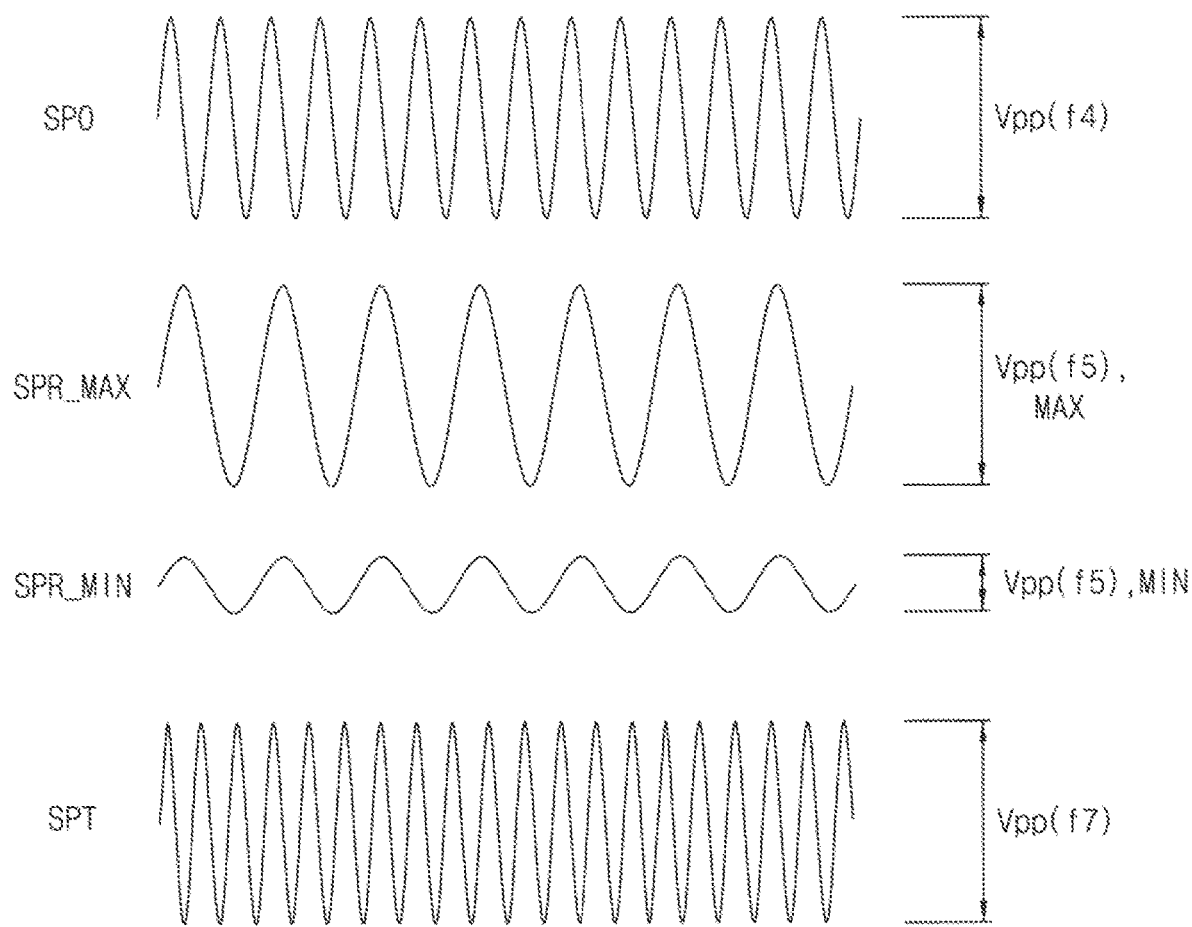
FIG. 14 is waveform diagrams explaining an example of a position sensing signal and a pressure sensing signal output from the stylus pen shown in FIG. 9.

FIG. 14 is waveform diagrams explaining an example of a position sensing signal SPO, a pressure sensing signal SPR and a tilt sensing signal SPT output from the stylus pen shown in FIG. 9.

Referring to FIG. 14, a fifth frequency component f4 of a position sensing signal SPO is set differently from the first to fourth frequency components f0, f1, f2 and f3 of the driving signal provided to the driving electrodes of the touch screen panel. Moreover, a sixth frequency component f5 of the pressure sensing signal SPR is set differently from the first to fourth frequency components f0, f1, f2 and f3 of the driving signal provided to the driving electrodes of the touch screen panel. Moreover, an eighth frequency component f7 of the tilt sensing signal SPT is set differently from the first to fourth frequency components f0, f1, f2 and f3 of the driving signal provided to the driving electrodes of the touch screen panel. Moreover, the fifth frequency component f4 of the position sensing signal SPO, the sixth frequency component f5 of the pressure sensing signal SPR, and the eighth frequency component f7 of the tilt sensing signal SPT are set differently from each other.

The position sensing signal SPO and the tilt sensing signal SPT have a fixed frequency and a fixed amplitude.

The pressure sensing signal SPR has a fixed frequency and a variable amplitude. An amplitude of the pressure sensing signal SPR may vary according to a pen pressure signal corresponding to a pressure applied to a stylus pen. For example, a pressure sense signal SPR having the maximum amplitude may be outputted when a high pen pressure signal is sensed, and a pressure sense signal SPR having the minimum amplitude may be outputted when a low pen pressure signal is sensed.

Meanwhile, the amplitude of the pressure sensing signal SPR may vary according to a button that can be operated by a user. The button may be provided in a stylus pen, and the amplitude of the pressure sensing signal SPR may be varied in accordance to the button.

Figure 15:
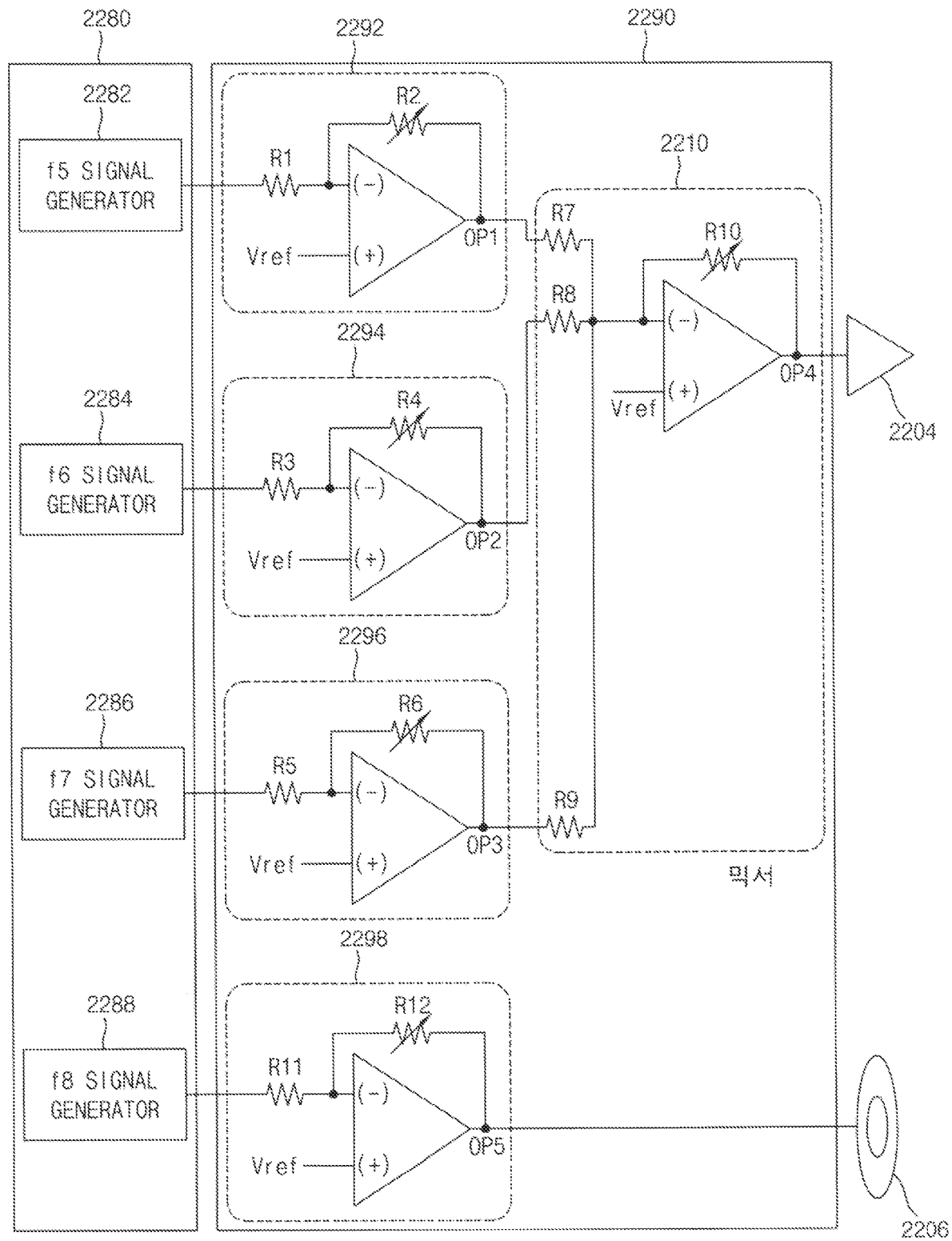
FIG. 15 is a circuit diagram explaining an example of the stylus pen shown in FIG. 9.

FIG. 15 is a circuit diagram explaining an example of the stylus pen shown in FIG. 9.

Referring to FIG. 15, the waveform generating part 2280 includes a fifth frequency signal generator 2282, a sixth frequency signal generator 2284 and a seventh frequency signal generator 2286, and the waveform driving part 2290 includes a first amplification part 2292, a second amplification part 2294, a third amplification part 2296, a mixer 2210 and a tip electrode 2204.

The first amplification part 2292 includes a first resistor R1, a second resistor R2, and a first operational amplifier OP1. A first terminal of the first resistor R1 receives the position sensing signal SPO, and a second terminal of the first resistor R1 is connected to an inverting terminal of the first operational amplifier OP1. A first terminal of the second resistor R2 is connected to a second terminal of the first resistor R1 and the inverting terminal of the first operational amplifier OP1, and a second terminal of the second resistor R2 is connected to the mixer 2210. The second resistor R2 may be a variable resistor. The inverting terminal of the first operational amplifier OP1 is connected to a second terminal of the first resistor R1 and a first terminal of the second resistor R2, and a non-inverting terminal of the first operational amplifier OP1 is connected to a reference voltage Vref.

The second amplification part 2294 includes a third resistor R3, a fourth resistor R4 and a second operational amplifier OP2. A first terminal of the third resistor R3 receives a position sensing signal SPO and a second terminal of the third resistor R3 is connected to an inverting terminal of the second operational amplifier OP2. A first terminal of the fourth resistor R4 is connected to a second terminal of the third resistor R3 and the inverting terminal of the second operational amplifier OP2, and a second terminal of the fourth resistor R4 is connected to the mixer 2210. The fourth resistor R4 may be a variable resistor. The inverting terminal of the second operational amplifier OP2 is connected to a second terminal of the third resistor R3 and a first terminal of the fourth resistor R4, and the non-inverting terminal of the second operational amplifier OP2 is connected to a reference voltage Vref.

The third amplifying part 2296 includes a fifth resistor R5, a sixth resistor R6 and a third operational amplifier OP3. A first terminal of the fifth resistor R5 receives a tilt sensing signal SPT, and a second terminal of the fifth resistor R5 is connected to an inverting terminal of the third operational amplifier OP3. A first terminal of the sixth resistor R6 is connected to a second terminal of the fifth resistor R5 and the inverting terminal of the third operational amplifier OP3, and a second terminal of the sixth resistor R6 is connected to the mixer 2210. The sixth resistor R6 may be a variable resistor. The inverting terminal of the third operational amplifier OP3 is connected to a second terminal of the fifth resistor R5 and a first terminal of the sixth resistor R6, and a non-inverting terminal of the third operational amplifier OP3 is connected to a reference voltage Vref.

The mixer 2210 includes a seventh resistor R7, an eighth resistor R8, a ninth resistor R9, a fourth operational amplifier OP4 and a tenth resistor R1. A first terminal of the seventh resistor R7 is connected to an output terminal of a first amplifier 2292, and a second terminal of the seventh resistor R7 is connected to an inverting terminal of the fourth operational amplifier OP4. A first terminal of the eighth resistor R8 is connected to an output terminal of a second amplifier 2294, and a second terminal of the eighth resistor R8 is connected to an inverting terminal of the fourth operational amplifier OP4. A first terminal of the ninth resistor R9 is connected to an output terminal of a third amplifier 2296, and a second terminal of the ninth resistor R9 is connected to the inverting terminal of the fourth operational amplifier OP4. The tenth resistor R10 is connected to the inverting and output terminals of the fourth operational amplifier OP4. The inverting terminal of the fourth operational amplifier OP4 is connected to a second terminal of the seventh resistor R7 and a second terminal of the eighth resistor R8, and the non-inverting terminal of the fourth operational amplifier OP4 is connected to a reference voltage Vref.

In the foregoing specification, it has been described that the position sensing signal SPO and the pressure sensing signal SPR are generated separately, and the generated signals are amplified and then mixed to provide a pen frequency signal to the tip electrode.

Figure 16:
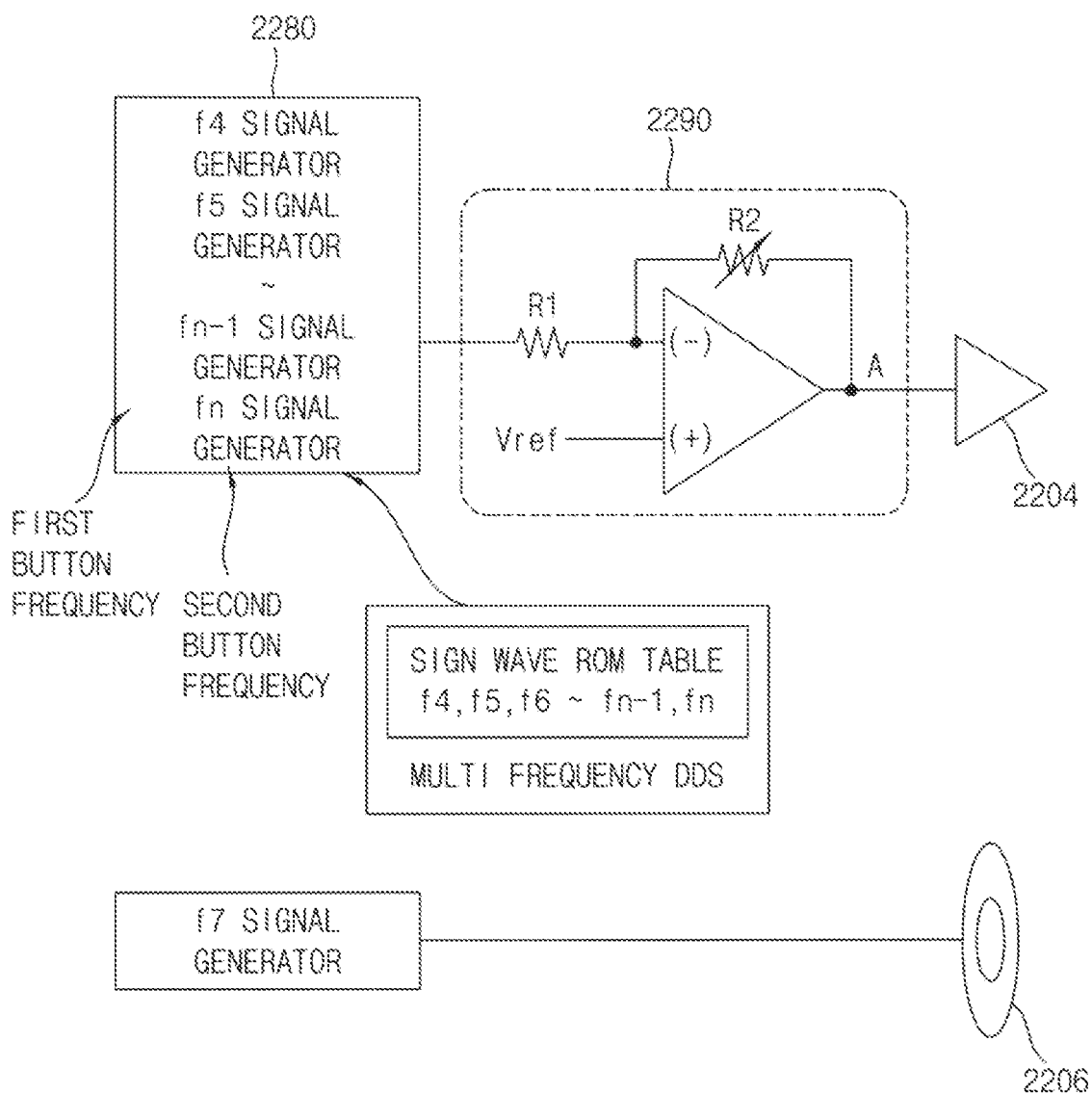
FIG. 16 is a circuit diagram explaining another example of the stylus pen shown in FIG. 9.

FIG. 16 is a circuit diagram explaining another example of the waveform generating part and the waveform driving part shown in FIG. 13.

Referring to FIG. 16, a waveform generator 2280 may include a digital function generator that provides a sinusoidal wave to the waveform driver 2290. The digital function generator may include a plurality of direct digital synthesis (hereinafter, "DDS") modules configured to precisely generate a sinusoidal wave of a precise frequency, period, and phase in response to control of the fan control part 2260 (shown in FIG. 12).

Each of the DDS modules may generate a plurality of frequency signals. For example, a position sensing signal SPO having a fifth frequency component f4, a pressure sensing signal SPR having a sixth frequency component f5, and a tilt sensing signal SPT having an eighth frequency component f7 may be generated. Moreover, a signal having a frequency component fn−1, a signal having a frequency component fn, or the like may be generated. Here, the signal having the frequency component fn−1 may be a frequency component corresponding to a first button provided to the stylus pen, and the signal having the frequency component fn may correspond to a second button provided to the stylus pen.

The waveform driving part 2290 includes a first resistor R1, a second resistor R2 and a first operational amplifier OP1. A first terminal of the first resistor R1 receives a sinusoidal signal from the waveform generator 2280, and a second terminal of the first resistor R1 is connected to an inverting terminal of the first operational amplifier OP1. A first terminal of the second resistor R2 is connected to the second terminal of the first resistor R1 and the inverting terminal of the first operational amplifier OP1, and a second terminal of the second resistor R2 is connected to the tip electrode 2204. The second resistor R2 may be a variable resistor. The inverting terminal of the first operational amplifier OP1 is connected to the second terminal of the first resistor R1 and a first terminal of the second resistor R2, and a non-inverting terminal of the first operational amplifier OP1 is connected to the reference voltage Vref.

Figure 17A:
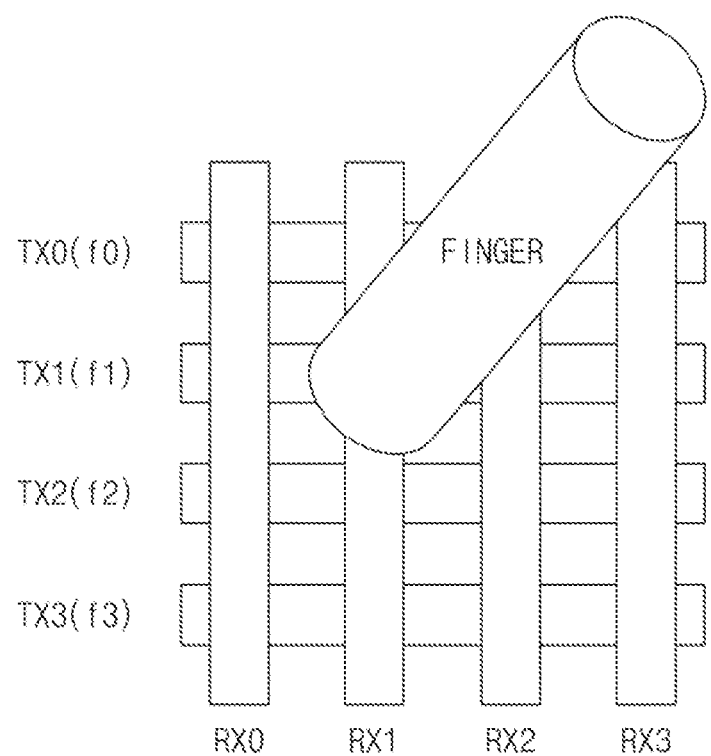
FIG. 17A is a schematic diagram of a touch screen panel explaining a touch by a finger.

FIG. 17A is a schematic diagram of a touch screen panel explaining a touch by a finger, and FIG. 17B is a waveform diagram explaining touch coordinate recognition through frequency spectrum analysis of a sensing signal by finger touch.

Referring to FIG. 17A, a first driving electrode TX0, a second driving electrode TX1, a third driving electrode TX2 and a fourth driving electrode TX3 are arranged in a horizontal direction on a touch screen panel, and a first sensing electrode RX0, a second sensing electrode RX1, a third sensing electrode RX2 and a fourth sensing electrode RX3 are arranged in the longitudinal direction on the touch screen panel. The first to fourth driving electrodes TX0, TX1, TX2 and TX3 are arranged in a lower area of the touch screen panel and the first to fourth sensing electrodes RX0, RX1, RX2 and RX3 are arranged in an upper area of the touch screen panel.

A first driving signal STX0, a second driving signal STX0, a third driving signal STX2 and a fourth driving signal STX3 are applied to the first driving electrode TX0, the second driving electrode TX1, the third driving electrode TX2 and the fourth driving electrode TX3, respectively. First to fourth sensing signals SRX0, SRX1, SRX2 and SRX3 corresponding to the applied driving signals STX0, STX1, STX2 and STX3 are received through a first sensing electrode RX0, a second sensing electrode RX1, a third sensing electrode RX2 and a fourth sensing electrode RX3, respectively. The received sensing signals are subjected to FFT processing to determine touch coordinates.

Referring to FIG. 17B, a sensing signal received through a second sensing electrode RX1 is subjected to FFT processing.

In the case of a base state in which there is no touch operation, the FFT-processed sensing signal has a first frequency component f0, a second frequency component f1, a third frequency component f2 and a fourth frequency component f3. Here, the amplitudes of the first to fourth frequency components f0, f1, f2 and f3 are equal to each other.

When a finger touches an area where the second driving electrode TX1 intersects with the second sensing electrode RX1, the FFT-processed sensing signal has a first frequency component f0, a second frequency component f1, a third frequency component f2 and a fourth frequency component f3. In this case, the amplitudes of the first frequency component f0, the third frequency component f2 and the fourth frequency component f3 are substantially equal to each other. The amplitude of the second frequency component f1 is smaller than the amplitude of the first frequency component f0.

When a waveform of a finger touch state is subtracted from a waveform of a base state, the second frequency component f1 only remains. The amplitude of the second frequency component f1 remaining after the subtraction may correspond to a finger touch sensitivity.

Therefore, since the second frequency component f1 is sensed corresponding to the second sensing electrode RX1, the second driving electrode TX1 delivering a second driving signal STX1 having the second frequency component f1 and the second sensing electrode RX1 are sensed as touch coordinates of a finger.

Figure 18A:
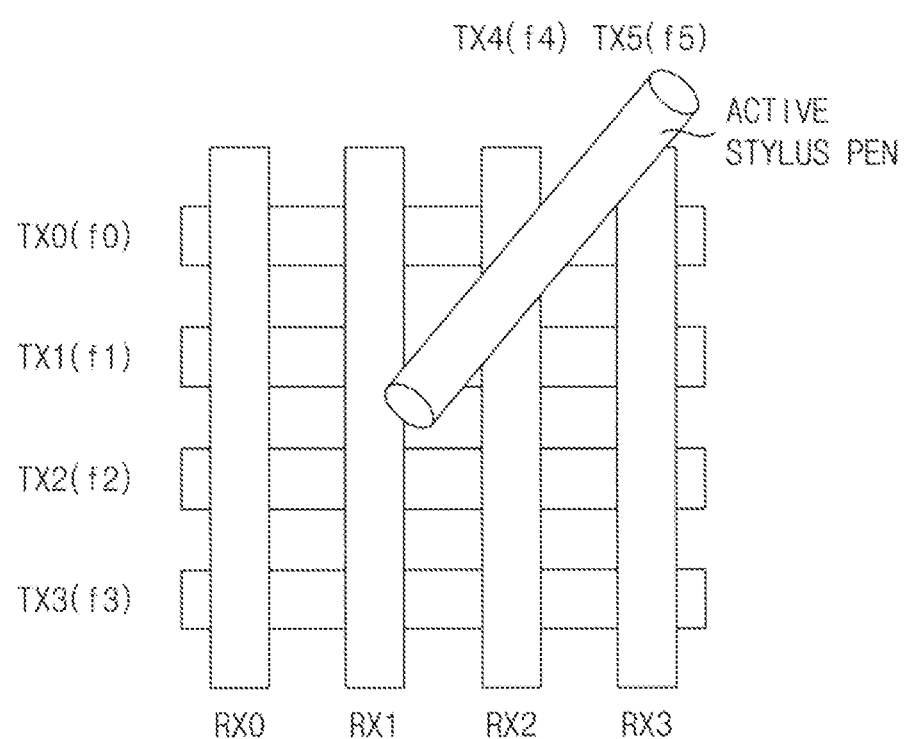
FIG. 18A is a schematic diagram of a touch screen panel explaining a touch by a stylus pen.

FIG. 18A is a schematic diagram of a touch screen panel explaining a touch by a stylus pen, and FIG. 18B is a waveform diagram explaining touch coordinate recognition through frequency spectrum analysis of a sensing signal by a stylus pen.

Since the touch screen panel shown in FIG. 18A has been described with reference to FIG. 16B, a description thereof will be omitted.

Referring to FIG. 18B, a sensing signal received through a second sensing electrode RX1 is FFT-processed.

In the case of a base state in which there is no touch operation, the FFT-processed sensing signal has a first frequency component f0, a second frequency component f1, a third frequency component f2 and a fourth frequency component f3. Here, the amplitudes of the first to fourth frequency components f0, f1, f2 and f3 are equal to each other.

When a stylus pen touches a region where the second driving electrode TX1 intersect with the second sensing electrode RX1, the FFT-processed sensing signal has a first frequency component f0, a second frequency component f1, a third frequency component f2, a fourth frequency component f3, a fifth frequency component f5 and a sixth frequency component f6. In this case, the amplitudes of the first to fourth frequencies f0, f1, f2 and f3 are substantially equal to each other. The amplitude of the fifth frequency component f5 is smaller than the amplitude of the first frequency component f0. The amplitude of the sixth frequency component f6 is smaller than the amplitude of the first frequency component f0. The amplitude of the sixth frequency component f6 is smaller than the amplitude of the fifth frequency component f5.

When a waveform of a stylus pen touch state is subtracted from a waveform of the base state, the fifth frequency component f5 and the sixth frequency component f6 only remain. The amplitude of the fifth frequency component f5 remaining after the subtraction may correspond to a touch sensitivity of a stylus pen. Moreover, the amplitude of the sixth frequency component f6 remaining after the subtraction may correspond to a pen pressure sensitivity of the stylus pen.

Thus, since the fifth frequency component f5 is sensed corresponding to the second sensing electrode RX1, it may be confirmed that a stylus pen is disposed on the second sensing electrode RX1. Therefore, the second sensing electrode RX1 is sensed as a first axis coordinate (e.g., X coordinate) of the stylus pen.

The touch coordinates by the stylus pen may be recognized in the above-described manner, and a more detailed description will be described with reference to FIGS. 19A to 21 described later.

Figure 19A:
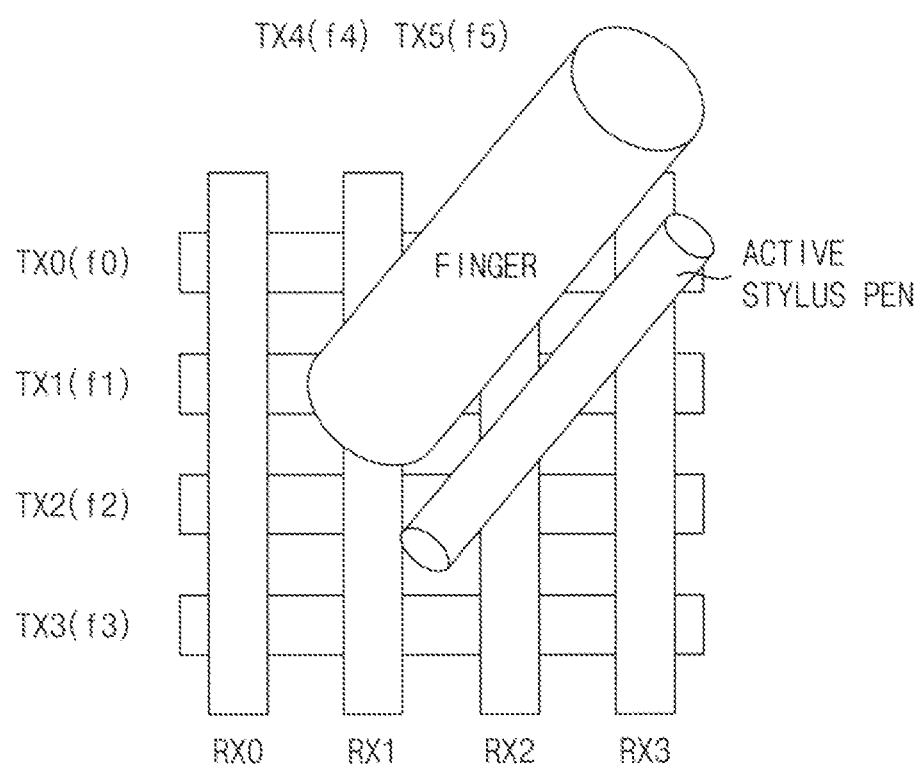
FIG. 19A is a schematic diagram of a touch screen panel explaining a touch by a finger and a stylus pen.

FIG. 19A is a schematic diagram of a touch screen panel explaining a touch by a finger and a stylus pen, and FIG. 19B is a waveform diagram explaining touch coordinate recognition through frequency spectrum analysis of a sensing signal by a finger and a stylus pen.

Since the touch screen panel shown in FIG. 19A has been described with reference to FIG. 16B, a description thereof will be omitted.

Referring to FIG. 19B, a sensing signal received through a second sensing electrode RX1 is FFT-processed.

In the case of a base state in which there is no touch operation, the FFT-processed sensing signal has a first frequency component f0, a second frequency component f1, a third frequency component f2 and a fourth frequency component f3. Here, the amplitudes of the first to fourth frequency components f0, f1, f2 and f3 are equal to each other.

When a finger touches an area where the second driving electrode TX1 intersects with the second sensing electrode RX1 and a stylus pen touches an area where the third driving electrode TX2 intersects with the second sensing electrode RX1, the FFT-processed sensing signal has a first frequency component f0, a second frequency component f1, a third frequency component f2, a fourth frequency component f3, a fifth frequency component f5 and a sixth frequency component f6. In this case, the amplitudes of the first frequency component f0, the third frequency component f2 and the fourth frequency component f3 are substantially equal to each other. The amplitude of the second frequency component f1 is smaller than the amplitude of the first frequency component f0. The amplitude of the fifth frequency component f5 is smaller than the amplitude of the first frequency component f0. The amplitude of the sixth frequency component f6 is smaller than the amplitude of the first frequency component f0. The amplitude of the sixth frequency component f6 is smaller than the amplitude of the fifth frequency component f5.

When a waveform of a mixed state is subtracted from a waveform of the base state, the second frequency component f1, the fifth frequency component f5 and the sixth frequency component f6 only remain. The amplitude of the second frequency component f1 remaining after the subtraction may correspond to a finger touch sensitivity. Moreover, the amplitude of the fifth frequency component f5 remaining after the subtraction may correspond to a touch sensitivity of the stylus pen. Moreover, the amplitude of the sixth frequency component f6 remaining after the subtraction may correspond to a pen pressure sensitivity of the stylus pen.

Thus, since the second frequency component f1 is sensed corresponding to the second sensing electrode RX1, the second driving electrode TX1 delivering a second driving signal STX1 having the second frequency component f1 and the second sensing electrode RX1 are sensed as touch coordinates of a finger. Moreover, since the fifth frequency component f5 is sensed corresponding to the second sensing electrode RX1, it may be confirmed that a stylus pen is disposed on the second sensing electrode RX1. Therefore, the second sensing electrode RX1 is sensed as a first axis coordinate of the stylus pen.

The touch coordinates by a finger and the touch coordinates by a stylus pen may be recognized in the above-described manner, and a more detailed description will be described later with reference to FIG. 20A to FIG. 22.

Figure 20A:
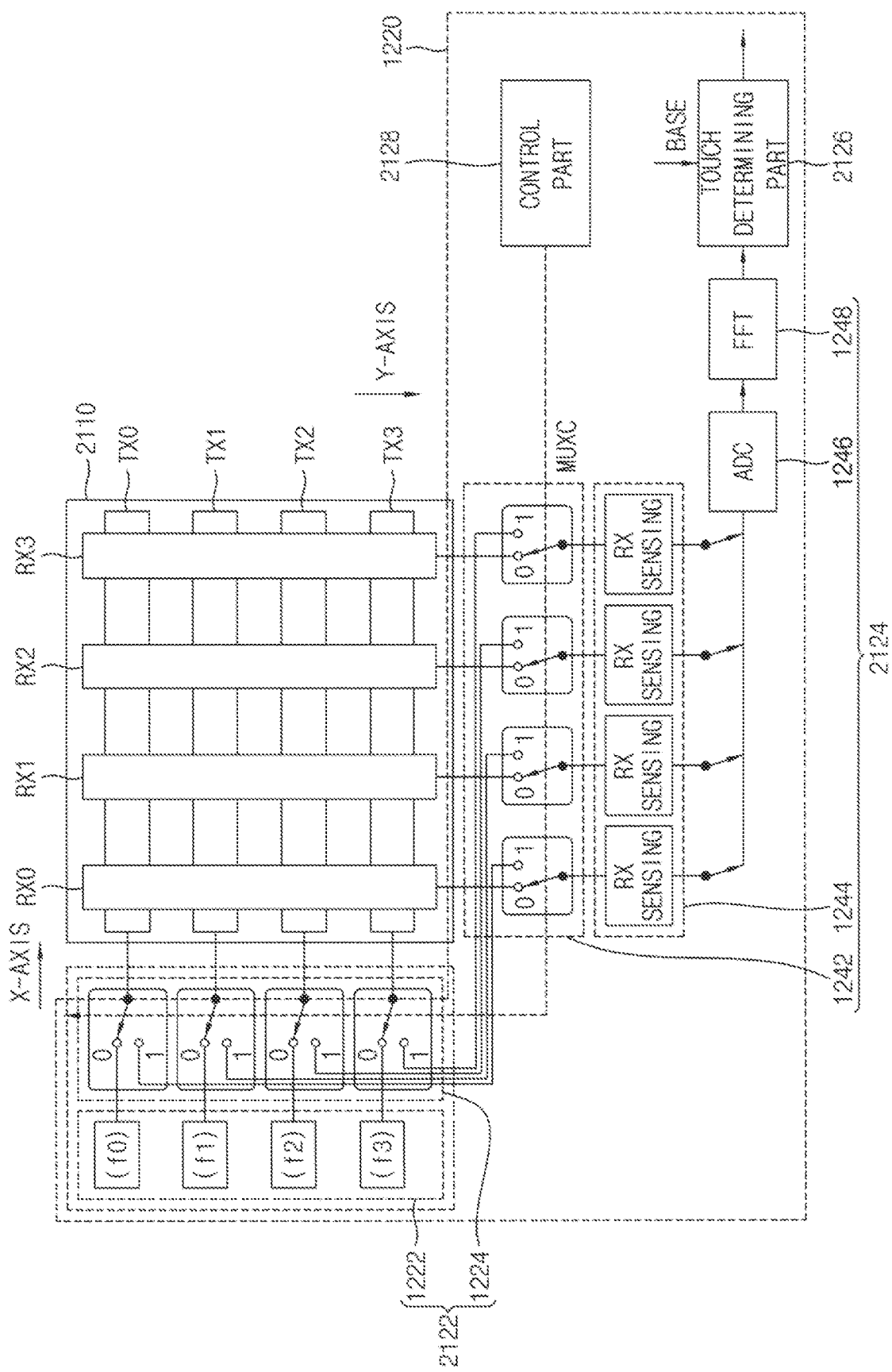
FIG. 20A and FIG. 20B are configuration diagrams of a touch sensing apparatus explaining touch coordinates recognition of a finger and a stylus pen.
Figure 20B:
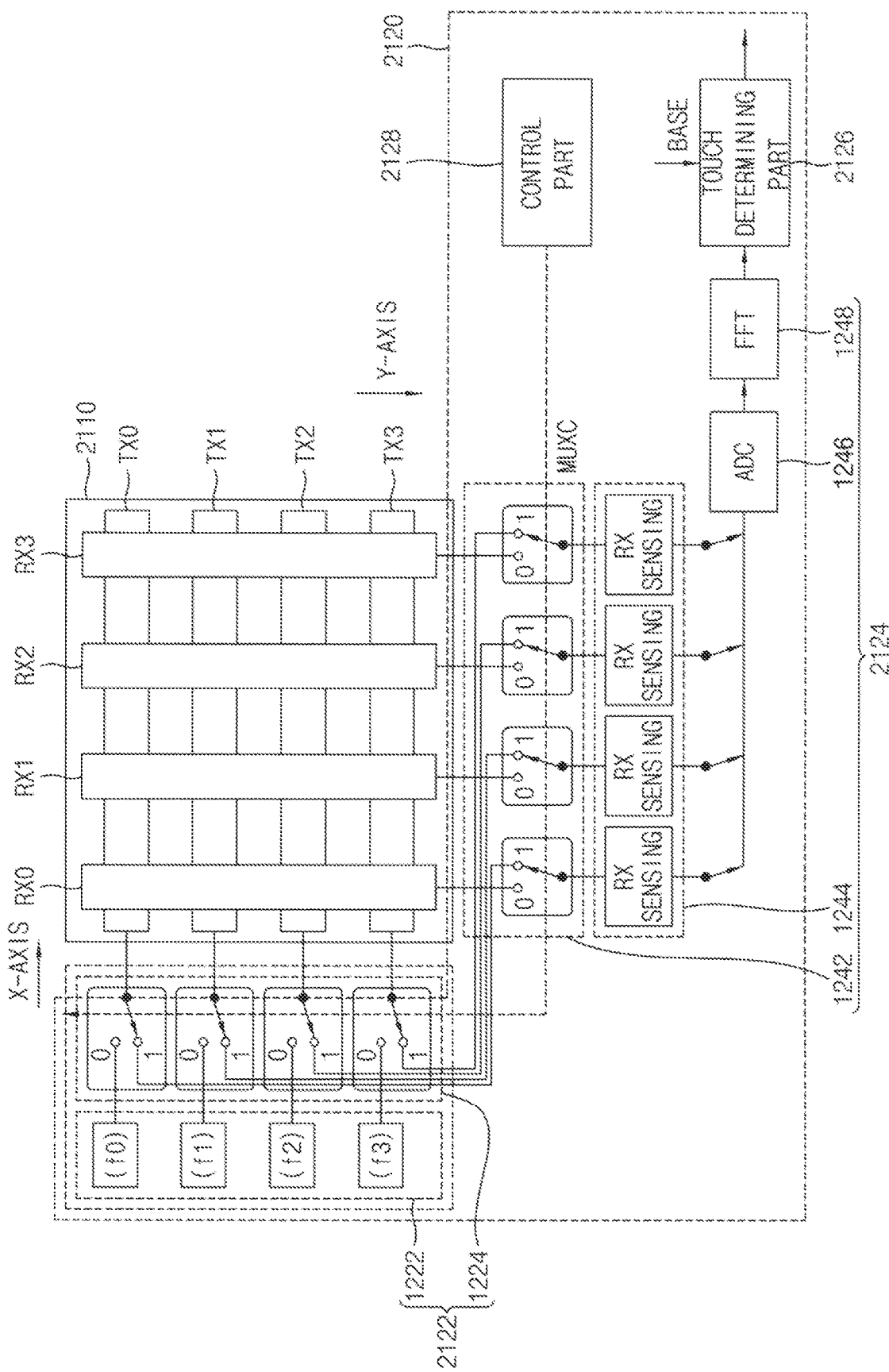

FIG. 20A and FIG. 20B are configuration diagrams of a touch sensing apparatus explaining touch coordinates recognition of a finger and a stylus pen. In particular, FIG. 20A is a configuration diagram of a touch sensing apparatus explaining the finger coordinates, the X-coordinate of the stylus pen, and the sensing of the pressure information of the stylus pen, and FIG. 20B is a configuration diagram of a touch sensing apparatus explaining Y-coordinate of the stylus pen and pressure information of the stylus pen Referring to FIG. 20A and FIG. 20B, a touch screen panel 2110 includes a first driving electrode TX0, a second driving electrode TX1, a third driving electrode TX2 and a fourth driving electrode TX1 arranged in a horizontal direction, and includes a first sensing electrode RX0, a second sensing electrode RX1, a third sensing electrode RX2 and a fourth sensing electrode RX3 arranged in a longitudinal direction. For convenience of explanation, it is shown that a touch screen panel 2110 of a 4×4 matrix in which four driving electrodes and four sensing electrodes are disposed.

In the touch screen panel 2110, the driving electrodes are orthogonally arranged to intersect with and overlap each of the sensing electrodes. Thus, each driving electrode is capacitively coupled to each of the sensing electrodes. For example, the second driving electrode TX1 is capacitively coupled to the second sensing electrode RX1 at a point where the second driving electrode TX1 and the second sensing electrode RX1 are overlapped with each other. The intersections of the driving electrodes and the sensing electrodes form a capacitive sensing element, respectively.

Due to a capacitive coupling between the driving electrode and the sensing electrodes, supplying a driving signal at each driving electrode may induce a current in each of the sensing electrodes. For example, when a driving signal is applied to a second driving electrode TX1, a driving signal induces a sensing signal on a second sensing electrode RX1 in the touch screen panel 110. Then, the sensing signal on each of the sensing electrodes may be sequentially measured by using a multiplexer in order to sequentially connect each of the sensing electrodes to a demodulation circuit. A capacitance associated with each intersection point between a driving electrode and a sensing electrode may be sensed by selecting each available combination of a driving electrode and a sensing electrode.

When a touch object such as a finger or a stylus approaches the touch screen panel 110, the object causes a reduction of capacitance, which affects only a part of the electrodes. For example, when a finger is positioned near an intersection of a second driving electrode TX1 and a second sensing electrode RX1, a presence of the finger reduces a coupling capacitance between the second driving electrode TX1 and the second sensing electrode RX1. In another exemplary embodiment, the presence of the finger increases the coupling capacitance between the second driving electrode TX1 and the second sensing electrode RX1. Thus, a position of a finger on the touch screen panel 110 may be determined by identifying a sensing electrode having a reduced coupling capacitance between the sensing electrode and the driving electrode to which the driving signal is applied when the reduced capacitance is measured on the sensing electrode. Thus, the capacitances associated with each intersection of the electrodes in the touch screen panel 110 are sequentially determined, so that positions of one or more inputs may be determined.

In the present exemplary embodiment, although the driving electrodes and sensing electrodes are shown as bars or elongated rectangles, alternative embodiments may be used to form a variety of mosaic shapes such as a diamond shape, a square shape, a gull shape, and other available shapes.

The touch sensing controller 2120 outputs a plurality of driving signals having different frequency components to the touch screen panel 2110 and determines at least one of touch coordinates of a finger and touch coordinates of a stylus pen based on the plurality of sensing signals provided from the touch screen panel 2110. The touch sensing controller 2120 may be implemented as one or a plurality of chips.

The touch sensing controller 2120 includes a touch driving part 2122, a touch sensing part 2124, a touch determining part 2126 and a touch control part 2128.

The touch driving part 2122 is connected to driving electrodes TX0, TX1, TX2 and TX3 of the touch screen panel 2110 that are in contact with a stylus pen that outputs a pen frequency signal set to sense a position of the stylus pen and a pressure of the stylus pen. The touch driving part 2122 outputs the driving signals to the driving electrodes TX0, TX1, TX2 and TX3.

The touch driving part 2122 includes a transmission signal generating part 1222 and a transmission multiplexing part 1224. The transmission signal generating part 1222 includes a plurality of transmission signal generators generating driving signals having different frequency components.

The transmission multiplexing part 1224 includes a plurality of transmission multiplexers having a first transmission input terminal (0) connected to the transmission signal generator, a second transmission input terminal (1) connected to the touch sensing part 124 and a transmission output terminal connected to the driving electrode. The first transmission input terminal is connected to the transmission output terminal or the second transmission input terminal is connected to the transmission output terminal in response to a multiplexer control signal MUXC provided from the touch control part 128.

The touch sensing part 2124 is connected to sensing electrodes RX0, RX1, RX2 and RX3 of the touch screen panel 2110 to receive the sensing signals through the sensing electrodes RX0, RX1, RX2 and RX3.

The touch sensing part 2124 includes a reception multiplexing part 1242, a reception sensing part 1244, an analog-to-digital converting part 1246 and a fast Fourier transform part 1248.

The reception multiplexing part 1242 includes a plurality of reception multiplexers having a reception output terminal, a first reception input terminal (0) connected to the sensing electrode and a second reception connection terminal (1) connected to a second transmission input terminal (1) of a transmission multiplexing part 1224 of the touch driving part 122. In response to the multiplexer control signal MUXC, the first reception input terminal is connected to the reception output terminal or the second reception input terminal is connected to the reception output terminal.

The reception sensing part 1244 includes a plurality of reception sensors connected to a reception output terminal of the reception multiplexers.

The analog-to-digital converting part 1246 digitally converts the sensing signals received through the reception sensors to provide the converted signals to the fast Fourier transform part 1248. The analog-to-digital converting part 1246 performs the ADC conversion at a frequency at least two times faster than the driving frequency.

The fast Fourier transform part 1248 performs fast Fourier transform each of the digitally converted sensing signals to convert each of the sensing signals into a frequency domain in a time domain. The fast Fourier transform part 1248 obtains a frequency component and the magnitude of the frequency component to provide the frequency component and the magnitude of the frequency component to the touch determining part 126. In the present exemplary embodiment, by converting the sensing in the time domain into the sensing in the frequency domain, it is very useful for digital signal processing.

The touch determining part 2126 determines at least one of a touch coordinates of the finger, a touch coordinates of the stylus pen, and a pressure information of the stylus pen, based on the amount of change between the frequency amplitudes of the fast Fourier-transformed sensing signal based on a frequency amplitude of a driving signal.

The touch control part 2128 controls an operation of the touch driving part 2122 such that driving signals having different frequency components are simultaneously supplied to the driving electrodes.

The touch control part 2128 provides information for a frequency of the driving signal to the analog-to-digital converting part 2126 so that the analog-to-digital converting part 1246 converts the frequency of the driving signal into a frequency faster than the frequency of the driving signal.

In the present exemplary embodiment, the touch sensing controller 2120 may further includes one or more memory devices (not shown) that store the measured size and associated parameters, and a microprocessor (not shown) that performs the necessary computation and control functions.

The touch sensing controller 2120 and/or other portions of the touch sensing device 2100 may be realized in one or more application-specific integrated circuits (ASICs), an application-specific standard product (ASSP), or the like, in order to perform one or more of the functions described herein.

In operation, as shown in FIG. 19A, in response to the multiplexer control signal MUXC, a first input terminal (0) of the transmission multiplexers and the driving electrodes are connected to each other, and a first input terminal (0) of the reception multiplexers and the reception sensing part 1244 are connected to each other. Thus, the touch coordinates of the finger, the first axis coordinate of the stylus pen and the pressure information of the stylus pen are sensed. In FIG. 19A, since the sensing electrodes RX0, RX1, RX2 and RX3 are arranged along the X-axis, the first axis coordinate of the stylus pen is the X coordinate.

Moreover, as shown in FIG. 19B, in response to the multiplexer control signal MUXC, a second input terminal (1) of the transmission multiplexers and the driving electrode are connected to each other, and a second input terminal (1) of the reception multiplexers and the reception sensing part 1244 are connected to each other. Thus, a second axis coordinate of the stylus pen and a pressure information of the stylus pen are sensed. In FIG. 19B, since the driving electrodes TX0, TX1, TX2 and TX3 are arranged along the Y-axis, the second axis coordinate of the stylus pen is the Y coordinate.

As described above, the touch sensing controller 2120 outputs a plurality of driving signals having different frequency components to the touch screen panel 2110, and determines at least one of the touch coordinates of the finger and the touch coordinates of the stylus pen based on a plurality of sensing signals received from the touch screen panel 2110, so that the finger touch recognition and the pen touch recognition may be realized at the same time.

Figure 21:
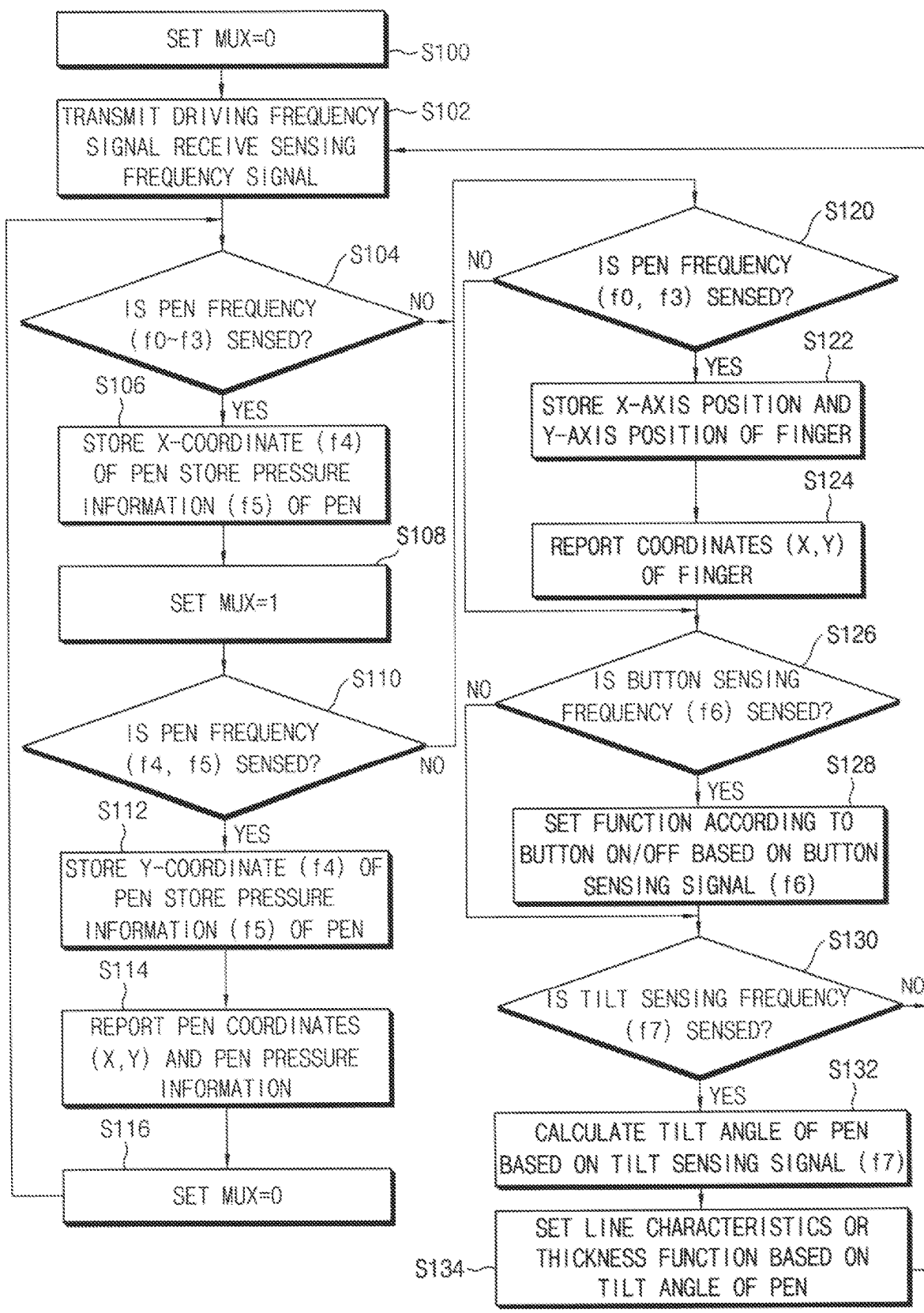
FIG. 21 is a flowchart explaining a touch coordinate recognition method in which a finger and a stylus pen are individually recognized in the touch sensing apparatus shown in FIG. 20A and FIG. 20B.

FIG. 21 is a flowchart explaining a touch coordinate recognition method in which a finger and a stylus pen are individually recognized in the touch sensing apparatus shown in FIG. 20A and FIG. 20B.

Referring to FIG. 20A, FIG. 20B and FIG. 21, the multiplexer (MUX) is set to 0 (step S100). That is, the first transmission input terminal (0) of the transmission multiplexers included in the transmission multiplexer 1224 and the driving electrodes TX0, TX1, TX2 and TX3 are connected to each other, and the first reception input terminal (0) of the reception multiplexers included in the reception multiplexer 1242 and the sensing electrodes RX0, RX1, RX2 and RX3 are connected to each other.

Then, the driving signals are transmitted to the driving electrodes TX0, TX1, TX2 and TX3, and the sensing signals are received through the sensing electrodes RX0, RX1, RX2 and RX3 (step S102).

Then, it is determined whether or not the pen frequency component is sensed by fast Fourier transforming the sensing signals (step S104). The pen frequency component includes pen X-axis position information (e.g., a fifth frequency component f4) and pen pressure information (e.g., a sixth frequency component f5).

When it is determined that the pen frequency components f4 and f5 are sensed in step S104, it stores the pen X-axis position information (e.g., a fifth frequency component f4) and pen pressure information (e.g., a sixth frequency component f5) (step S106).

Then, the MUX is set to 1 (step S108). That is, the second transmission input terminal (1) of the transmission multiplexers included in the transmission multiplexer 1224 and the driving electrodes TX0, TX1, TX2 and TX3 are connected to each other, and the second reception input terminal (1) of the reception multiplexers includes in the reception multiplexer part 1242 and the sensing electrodes RX0, RX1, RX2 and RX3 are connected to each other.

Then, it is determined whether or not the pen frequency components f4 and f5 by fast Fourier transforming sensing signals received through the sensing electrodes RX0, RX1, RX2 and RX3 (step S110).

When it is determined that the pen frequency components f4 and f5 are sensed in step S110, it stores the pen Y-axis position information f4 and the pen pressure information f5 (step S112).

Then, pen coordinate (X,Y) information and pen pressure information are reported (step S114). The pen coordinate (X,Y) is the pen X-axis position information f4 stored in step S106 and the pen Y-axis position information f4 stored in step S112. The pressure information f5 of the pen may be the pressure information f5 of the pen stored in step S106 or the pressure information f5 of the pen stored in step S112.

Then, after the MUX is set to 0 (step S116), the process returns to step S104. That is, the first transmission input terminal (0) of the transmission multiplexers included in the transmission multiplexer 1224 and the driving electrodes TX0, TX1, TX2 and TX3 are connected to each other, the first reception input terminal (0) of the reception multiplexers included in the reception multiplexer 1242 and the sensing electrodes RX0, RX1, RX2 and RX3 are connected to each other, and then the process returns to step S104.

Meanwhile, when it is determined that the pen frequency components f4 and f5 are not sensed in step S104, it is determined whether or not the transmission frequency components f0 to f3 are sensed by sensing RX sensing (step S120).

When it is determined that the transmission frequency components f0 to f3 are not sensed in step S120, the process returns to step S102. When it is determined that the transmission frequency components f0 to f3 are sensed in step S120, the touch coordinates of the finger are stored (step S122), and the stored finger coordinates is reported (step S124).

After reporting the finger coordinates in step S124 or when it is determined that the transmission frequency components f0 to f3 are not sensed in step SS120, it is determined whether or not the button sensing frequency component f6 is sensed (step S126).

When it is determined that the button sensing frequency component f6 is sensed in step S126, a function corresponding to the button on/off is set based on the button sensing signal corresponding to the button sensing frequency component f6 (step S128).

When it is determined whether the button sensing frequency component f6 is not sensed in step S126 or after performing step S128, it is determined whether or not the tilt sensing frequency component f7 is sensed (step S130).

When it is determined that the tilt sensing frequency component f7 is sensed, the tilt angle of the pen is calculated based on the tilt sensing signal corresponding to the tilt sensing frequency component f7 (step S132).

Then, the line characteristic or the thickness function is set based on the tilt angle of the pen (step S134), and then the process returns to step S102. Here, the characteristic of the line may mean whether the drawn line is a characteristic of a line by a fountain pen, a characteristic of a line by a crayon, and a characteristic of a line by a pencil. Moreover, the thickness of the line may be displayed in various forms such as a thin-line, a medium-thick line, and a thick-line depending on the tilt angle.

Figure 22:
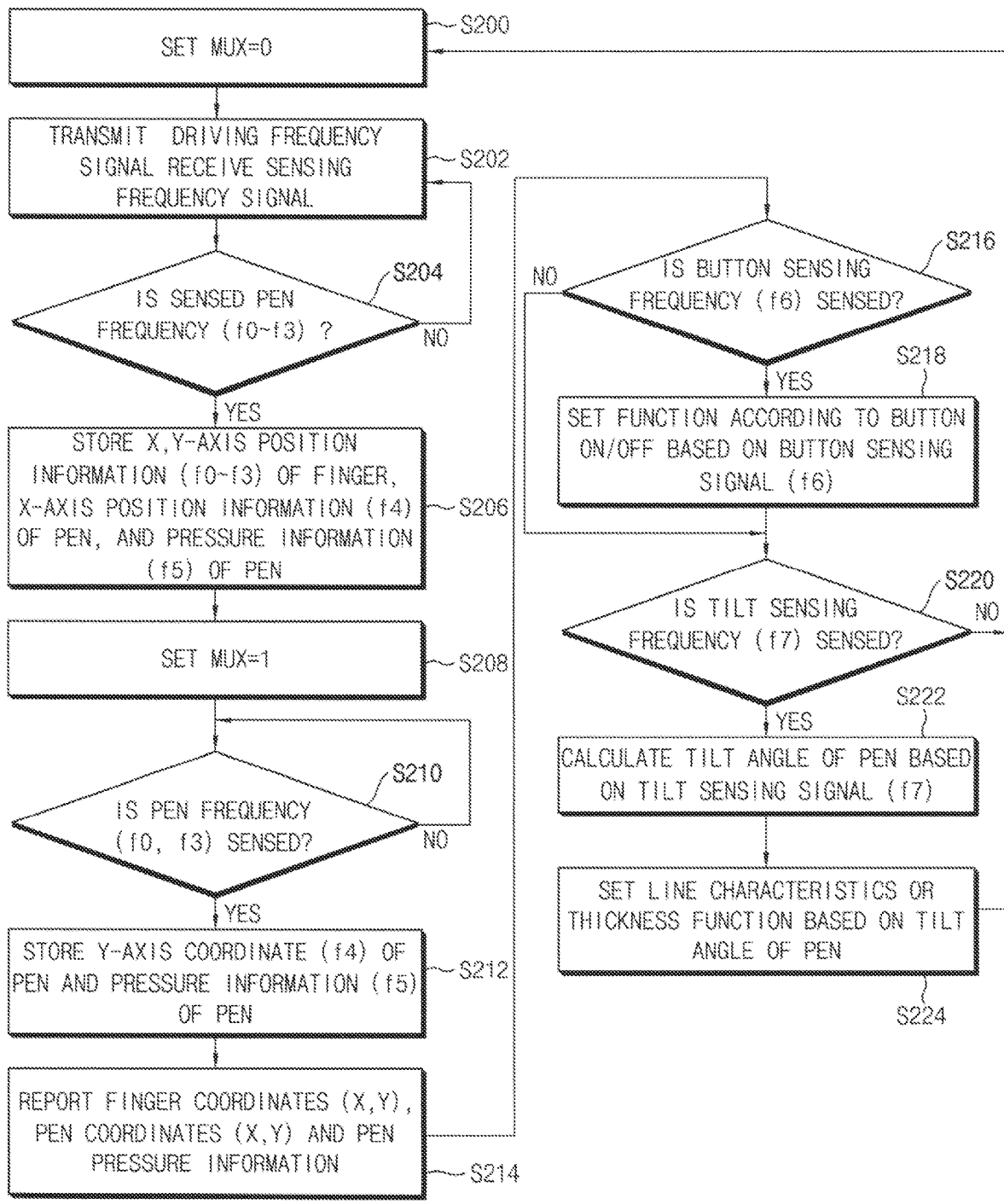
FIG. 22 is a flowchart explaining a touch coordinate recognition method in which a finger and a stylus pen are simultaneously recognized in the touch sensing apparatus shown in FIG. 20A and FIG. 20B.

FIG. 22 is a flowchart explaining a touch coordinate recognition method in which a finger and a stylus pen are simultaneously recognized in the touch sensing apparatus shown in FIG. 20A and FIG. 20B.

Referring to FIG. 20A, FIG. 20B and FIG. 22, the MUX is set to 0 (step S200). That is, the first transmission input terminal (0) of the transmission multiplexers included in the transmission multiplexer part 1224 and the driving electrodes TX0, TX1, TX2 and TX3 are connected to each other, and the first reception input terminal (0) of the reception multiplexers included in the reception multiplexer part 1242 and the sensing electrodes RX0, RX1, RX2 and RX3 are connected to each other.

Then, the driving signals are transmitted to the driving electrodes TX0, TX1, TX2 and TX3, and the sensing signals are received through the sensing electrodes RX0, RX1, RX2 and RX3 (step S202).

Then, the sensing signals are FFT-processed to check whether the pen frequency components f0 to f5 are sensed (step S204).

When it is determined that the pen frequency components f0 to f5 are not sensed in step S204, the process returns to step S202.

When it is determined that the pen frequency components f0 to f5 are sensed in step S204, the pen X-axis position information f4 is stored and the pen pressure information f5 is stored (step S206).

Then, the MUX is set to 1 (step S208). That is, the second transmission input terminal (1) of the transmission multiplexers included in the transmission multiplexer 1224 and the driving electrodes TX0, TX1, TX2 and TX3 are connected to each other, and the second reception input terminal (1) of the reception multiplexers included in the reception multiplexer 1242 and the sensing electrodes RX0, RX1, RX2 and RX3 are connected to each other.

Then, the sensing signals received through the sensing electrodes RX0, RX1, RX2 and RX3 are FFT-processed to check whether the pen frequency components f4 and f5 are sensed (step S210).

When it is determined that the pen frequency components f4 and f5 are sensed in step S210, the pen Y-axis position information f4 is stored and the pen pressure information f5 is stored (step S212).

Then, finger coordinate (X,Y) information, pen coordinate (X,Y) information, and pen pressure information are reported (step S214). The finger coordinate (X,Y) information is the pen X-axis coordinate stored in step S206 and the pen Y-axis coordinate stored in step S212. The pen pressure information may be the pressure information f5 of the pen stored in step S206 or the pressure information f5 of the pen stored in step S212.

After performing step S214, it is determined whether or not the button sensing frequency component f6 is sensed (step S216).

When it is determined that the button sensing frequency component f6 is sensed in step S216, a function corresponding to the button on/off is set based on the button sensing signal corresponding to the button sensing frequency component f6 (step S218).

In step S216, it is determined whether the button sensing frequency component f6 is not sensed or after performing step S218, it is determined whether or not the tilt sensing frequency component f7 is sensed (step S220).

When it is determined that the tilt sensing frequency component f7 is sensed in step S220, the tilt angle of the pen is calculated based on the tilt sensing signal corresponding to the tilt sensing frequency component f7 (step S222).

Then, the line characteristic or the thickness function is set based on the tilt angle of the pen (step S224), and the process returns to step S200.

Although the operations of the method(s) herein are shown and described in a particular order, the operations of each method may be performed such that certain operations may be performed in reverse order, or that a particular operation may be performed at least partially concurrently with other operations. In other embodiments, the instructions or sub-operations of the individual operations may be intermittent and/or alternate.

Figure 23:
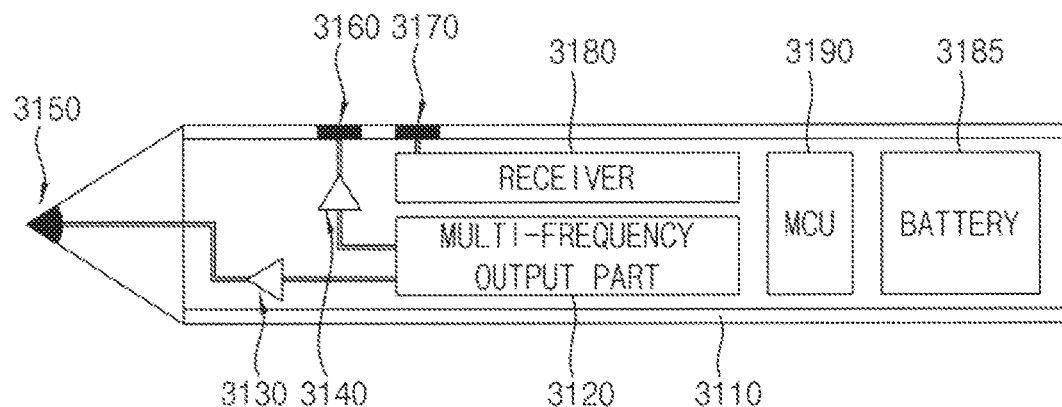
FIG. 23 is a configuration diagram explaining a stylus pen according to an exemplary embodiment of the present invention.

FIG. 23 is a configuration diagram explaining a stylus pen 3200 according to an exemplary embodiment of the present invention.

Referring to FIG. 23, a stylus pen according to an exemplary embodiment of the present invention includes a pen body 3110, a multi-frequency output part 3120, a first buffer 3130, a second buffer 3140, a stylus tip 3150, a first contact electrode 3160, a second contact electrode 3170, a receiver 3180, a battery 3185 and a main control unit 3190.

The pen body 3110 is made of a conductive material as a whole or partly to have a rod shape. The stylus tip 3150 is connected to a first terminal of the pen body 3110 in a protruding manner.

The multi-frequency output part 3120 is disposed in the pen body 3110 to provide a finger frequency signal to the first buffer 3130 and a tip frequency signal to the second buffer 3140. The finger frequency signal may be a pulse wave. The tip frequency signal may be a sinusoidal wave or a pulse wave.

In detail, the multi-frequency output part 3120 provides the tip frequency signal to the stylus tip 3150 via the first buffer 3130 and provides the tip frequency signal to the first contact electrode 3160 via the second buffer 3140. The tip frequency signal may be output under a control of the main control unit 3190 after the finger frequency signal is output. The tip frequency signal is changed to a sensing signal to be provided to an external read-out circuit (not shown). The read-out circuit may be mounted on a touch screen panel (not shown). The read-out circuit calculates touch coordinates of the stylus tip 3150 based on the sensing signal.

The first buffer 3130 is connected between the multi-frequency output part 3120 and the stylus tip 3150 to provide the stylus tip 3150 with a tip frequency signal output from the multi-frequency output part 3120.

The second buffer 3140 is connected between the multi-frequency output part 3120 and the pen body 3110 to provide the first contact electrode 3160 with a finger frequency signal output from the multi-frequency output part 3120.

The stylus tip 3150 is disposed at an end portion of the pen body 3110 to receive the tip frequency signal.

A first contact electrode 3160 is disposed on some side of the pen body 3110 to receive a finger frequency signal.

The second contact electrode 3170 is spaced apart from the first contact electrode 3160 to be disposed on another side surface of the pen body 3110. The second contact electrode 3170 receives a finger frequency signal from the first contact electrode 3160 via the finger.

The receiver 3180 is connected to the second contact electrode 3170 to receive a finger frequency signal through the second contact electrode 3170 and provides it to the main control unit 3190.

The battery 3185 supplies power for operation to various electronic components of a stylus pen, such as a multi-frequency output part 3120, a first buffer 3130, a second buffer 3140, a stylus tip 3150, the first contact electrode 3160, the second contact electrode 3170, the receiver 3180 and the main control unit 3190.

The main control unit 3190 is disposed in the pen body 3110 to control the multi-frequency output part 3120 by determining a frequency of the finger frequency signal and the frequency of the tip frequency signal. In detail, the main control unit 3190 determines that the stylus pen is in the untouched state when the finger frequency signal is not transmitted through the first contact electrode 3160 to the second contact electrode 3170. Meanwhile, when it is determined that the finger frequency signal is transmitted through the first contact electrode 3160 to the second contact electrode 3170, the main control unit 3190 determines that the stylus pen is in the touch state and requests the output of the tip frequency signal to the multi-frequency output part 3120.

Figure 24A:
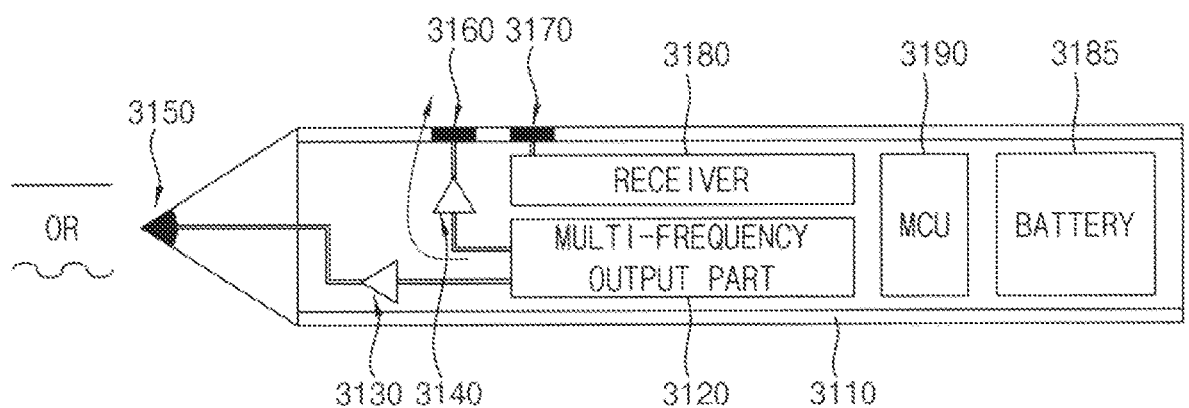
FIG. 24A is a configuration diagram explaining a signal flow when the stylus pen shown in FIG. 23 is not used.
Figure 24B:
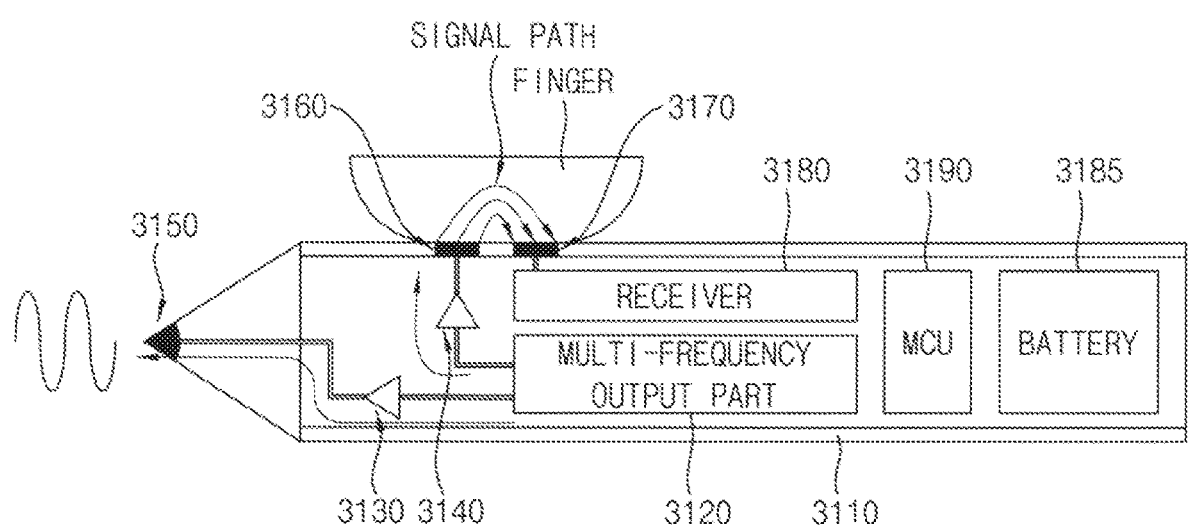
FIG. 24B is a configuration diagram explaining a signal flow when the stylus pen shown in FIG. 23 is used.

FIG. 24A is a configuration diagram explaining a signal flow when the stylus pen shown in FIG. 23 is not used, and FIG. 24B is a configuration diagram explaining a signal flow when the stylus pen shown in FIG. 23 is used.

When the stylus pen is not used, there is no finger of the user in the pen body 3110 as shown in FIG. 24A. Accordingly, a floating state is maintained between the first contact electrode 3160 and the second contact electrode 3170.

The multi-frequency output part 3120 outputs the finger frequency signal to the first contact electrode 3160 via the first buffer 3130, but the finger frequency signal is not received at the receiver 3180.

Therefore, since no signal is transmitted to the main control unit 3190, the stylus pen determines that it is in the current untouched state.

When a stylus pen is used, there is a finger of the user in the pen body 3110 as shown in FIG. 24B. Accordingly, a conductive path is formed between the first contact electrode 3160 and the second contact electrode 3170, so that a finger frequency signal output from the first contact electrode 3160 is transmitted to the second contact electrode 3170.

The finger frequency signal transmitted to the second contact electrode 3170 is transmitted to the receiver 3180. The receiver 3180 provides the finger frequency signal to the main control unit 3190.

Therefore, since the finger frequency signal is transmitted to the main control unit 3190, the stylus pen determines that the stylus pen is currently in the touch state.

FIG. 25 is a waveform diagram explaining driving signals of the stylus pen shown in FIG. 23.

Referring to FIG. 25, a finger frequency signal of a predetermined period is output through the first contact electrode 3160. The finger frequency signal may be continuously output with a predetermined period.

When the first contact electrode 3160 and the second contact electrode 3170 are not electrically connected by the finger, the tip frequency signal output through the stylus tip remains in an inactive state. That is, the tip frequency signal is not output through the stylus tip.

Meanwhile, when the first contact electrode 3160 and the second contact electrode 3170 are electrically connected by the finger, the tip frequency signal output through the stylus tip remains in an active state. That is, the tip frequency signal has a predetermined level to be outputted through the stylus tip.

Meanwhile, when the finger is separated from the stylus pen, the second contact electrode 3170 does not receive the finger frequency signal. Thus, the tip frequency signal applied to the stylus pen is switched to the inactive state. That is, the tip frequency signal is not outputted.

Figure 26:
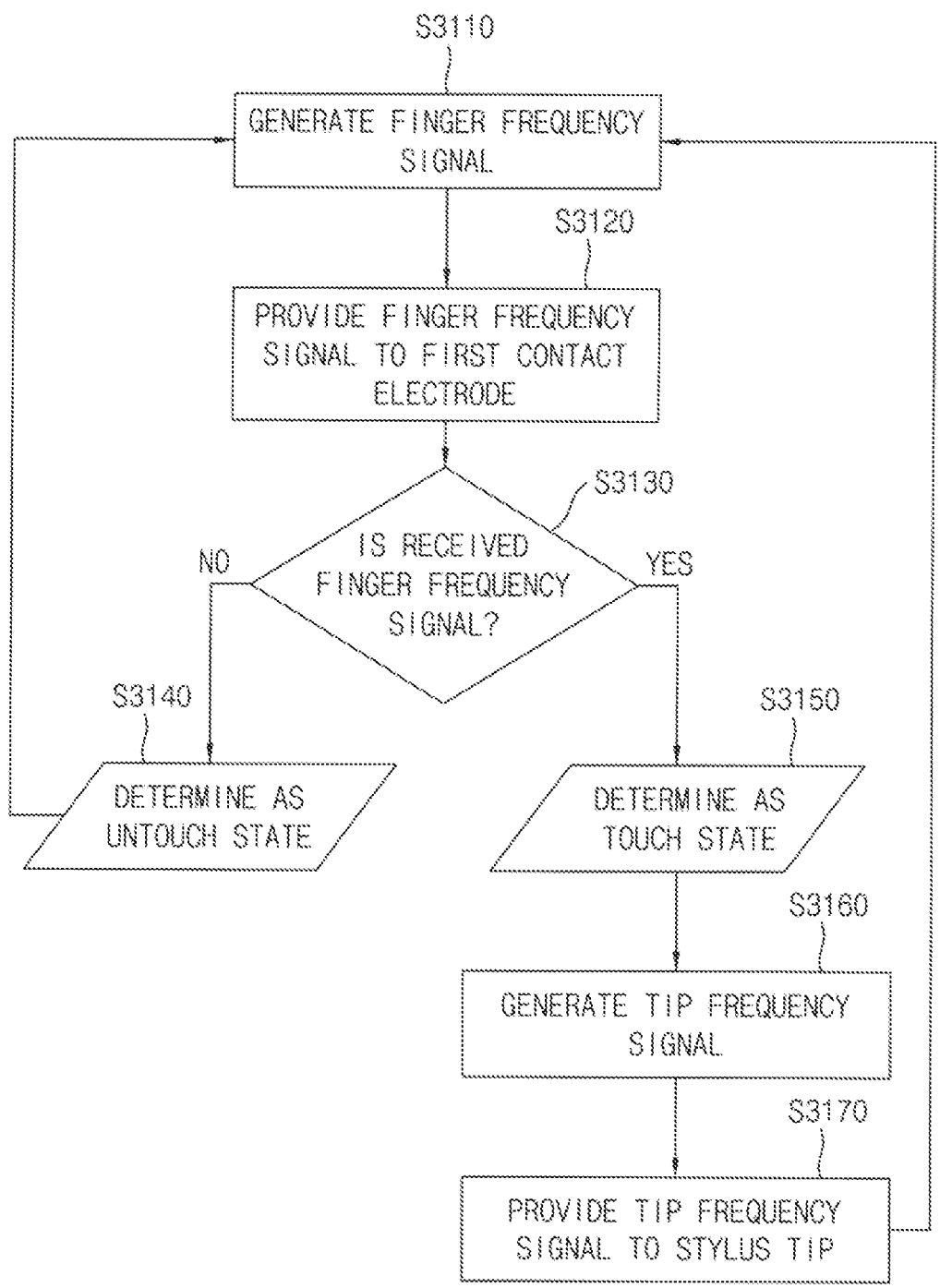
FIG. 26 is a flowchart explaining a driving method of the stylus pen shown in FIG. 23.

FIG. 26 is a flowchart explaining a driving method of the stylus pen shown in FIG. 23.

Referring to FIG. 23 to FIG. 26, the multi-frequency output part 3120 generates a finger frequency signal (step S3110).

Then, the multi-frequency output part 3120 provides the finger frequency signal to the first contact electrode 3160 via the second buffer 3140 (step S3120).

Then, the main control unit 3190 checks whether or not the finger frequency signal is received via the receiver 3180 through the second contact electrode 3170 (step S3130).

When it is determined that the finger frequency signal is not received via the receiver 3180 through the second contact electrode 3170 in step S3130, the main control unit 3190 determines that the stylus pen is in the untouched state, and then proceeds to the step S3110 (step S3140).

When it is determined that the finger frequency signal is received via the receiver 3180 through the second contact electrode 3170 in step S3130, the main control unit 3190 determines the touch state of the stylus pen (step S3150).

Following step S3150, the multi-frequency output part 3120 generates a tip frequency signal (step S3160).

Following step S3160, the multi-frequency output part 3120 provides the tip frequency signal to the stylus tip 3150 via the first buffer 3130, and then proceeds to the step S3110 (step S3170).

As described above, according to the present invention, the power consumption of the stylus pen may be reduced by controlling the output of the tip frequency signal outputted from the stylus pen when using the stylus pen and when not using the stylus pen.

Having described exemplary embodiments of the present invention, it is further noted that it is readily apparent to those of reasonable skill in the art that various modifications may be made without departing from the spirit and scope of the invention which is defined by the metes and bounds of the appended claims.

| [DESCRIPTION OF REFERENCE NUMBERALS] | |
|---|---|
| 100: Touch screen panel | 200: Active stylus pen |
| 210: Conductive pen case | 220: Stylus tip |
| 230, 430, 630, 830: Signal supply part | 232, 3130: First buffer |
| 234, 3140: Second buffer | |
| 236, 436, 636, 836: Multi-frequency output part | |
| 238, 438, 636, 836: Main control unit | |
| 437, 837: Gyro sensor | 640: Erasing member |
| 2100: Touch sensing device | 2120: Touch sensing controller |
| 2122: Touch driving part | 2124: Touch sensing part |
| 2126: Touch determining part | 2128: Touch control part |
| 1222: Transmission signal generating part | 1224: Transmission multiplexing part |
| 1242: Reception multiplexing part | 1244: Reception sensing part |
| 1246: Analog-to-digital converting part | 1248: Fast Fourier transform part |
| 2200: Active stylus pen | 2202: Conductive case |
| 2204: Tip electrode | 2206: Pen pressure sensor |
| 2209: Ring electrode | 2208: Frequency signal generator |
| 2210: Mixer | 2250: Buttons |
| 2252: Button processing part | 2260: Pen control part |
| 2206: Pen pressure sensor | 2207: Pen pressure processing part |
| 2260: Pen control part | 2270: Power managing part |
| 2272: Battery | 2280: Waveform generating part |
| 2290: Waveform driving part | 2282: Fifth frequency signal generator |
| 2284: Sixth frequency signal generator | 2286: Seventh frequency signal generator |
| 2292: First amplification part | 2294: Second amplification part |
| 2296: Third amplification par | 3110: Pen body |
| 3120: Multi-frequency output part | 3150: Stylus tip |
| 3160: First contact electrode | 3170: Second contact electrode |
| 3180: Receiver | 3190: Main control unit |

What is claimed is:

1. An active stylus pen comprising:
   a pen case;
   a stylus tip connected to a first terminal of the pen case; and
   a signal supply part supplying a pen driving signal to the stylus tip and providing the pen case with a palm rejection signal,
   wherein the pen driving signal comprises a position sensing signal set to sense the position of the active stylus pen and a pressure sensing signal set to sense the pressure of the active stylus pen.

2. The active stylus pen of claim 1, wherein the pen driving signal is changed to a sensing signal and provided to an external read-out circuit, the palm rejection signal is provided to the read-out circuit via a user's hand and a touch screen panel,
   wherein the read-out circuit calculates touch coordinates based on the sensing signal and ignores the touch caused by the palm rejection signal.

3. The active stylus pen of claim 1, wherein the pen driving signal has a first frequency and the palm rejection signal has a second frequency, wherein the signal supply part comprises:
   a first buffer being connected to the stylus tip;
   a second buffer being connected to the pen case;
   a multi-frequency output part outputting the pen driving signal having the first frequency to the first buffer and outputting the palm rejection signal having the second frequency to the second buffer; and
   a main control unit disposed in the pen case to control the multi-frequency output part by determining the first frequency and the second frequency.

4. A touch sensing system comprising:
   an active stylus pen comprising a pen case of a conductive material, a stylus tip connected to a first terminal of the pen case, and a signal supply part supplying a pen driving signal to the stylus tip and providing the pen case with a palm rejection signal;
   a touch screen panel comprising a driving line transmitting the pen driving signal and the palm rejection signal and a sensing line transmitting a sensing signal induced in the driving line; and
   a read-out circuit classifying a first signal corresponding to the pen driving signal and a second signal corresponding to the palm rejection signal provided from the sensing line, ignoring the touch caused by the second signal, and calculating touch coordinates based on the first signal,
   wherein the pen driving signal comprises a position sensing signal set to sense the position of the active stylus pen and a pressure sensing signal set to sense the pressure of the active stylus pen.

5. The touch sensing system of claim 4, wherein the pen driving signal is provided to the read-out circuit as the first signal via the stylus tip and the touch screen panel, and
   the palm rejection signal is provided to the read-out circuit as the second signal via the pen case, the user's hand and the touch screen panel.

6. The touch sensing system of claim 4, wherein the active stylus pen further comprises a gyro sensor disposed in the pen case to sense a tilt including movements of the active stylus pen, tilt-up moving an up direction, tilt-down moving a down direction and tilting amount.

7. The touch sensing system of claim 6, wherein the signal supply part applies a signal different from the pen driving signal to the stylus tip when a gyro signal of the pen is sensed by the gyro sensor.

8. The touch sensing system of claim 6, wherein the active stylus pen further comprises an erasing member disposed in an opposite direction to the stylus tip, and
   the signal supply part applies a third signal to the erasing member when a gyro signal of the pen is sensed by the gyro sensor.

9. The touch sensing system of claim 8, wherein the read-out circuit deletes touch coordinates corresponding to the third signal from the drawing when the third signal is sensed through the sensing line.

10. A touch sensing method comprising:
    generating a pen driving signal and a palm rejection signal;
    providing a stylus tip with the pen driving signal;
    applying the palm rejection signal to the pen case;
    sensing a sensing signal induced in a driving line transmitting the pen driving signal and the palm rejection signal through a sensing line;
    classifying the sensing signal into a first signal corresponding to the pen driving signal and a second signal corresponding to the palm rejection signal; and
    calculating the touch coordinates based on the first signal while ignoring the touch caused by the second signal,
    wherein the pen driving signal comprises a position sensing signal set to sense the position of the active stylus pen and a pressure sensing signal set to sense the pressure of the active stylus pen.

11. A touch sensing system comprising:
    a touch screen panel comprising a plurality of driving electrodes and a plurality of sensing electrodes;
    an active stylus pen providing the touch screen panel with a pen driving signal set to sense the position of the active stylus pen, the pressure of the active stylus pen, and the tilt of the active stylus pen and mixing a button sensing signal for sensing a button on/off state of the active stylus pen with the pen driving signal, and further provides the touch screen panel with the mixing result; and
    a touch sensing controller outputting a plurality of driving signals having different frequency components to the touch screen panel, and determining at least one of touch coordinates of the finger and touch coordinates of the active stylus pen based on a plurality of sensing signals received at the touch screen panel.

12. The touch sensing system of claim 11, wherein the pen driving signal comprises a position sensing signal set to sense the position of the active stylus pen, a pressure sensing signal set to sense the pressure of the active stylus pen, and a tilt sensing signal set to sense the tilt of the active stylus pen.

13. The touch sensing system of claim 11, wherein the position sensing signal and the pressure sensing signal are provided to a tip electrode of the active stylus pen, and the tilt sensing signal is provided to a ring electrode of the active stylus pen.

14. A touch sensing controller comprising:
    a touch driving part being connected to driving electrodes of a touch screen panel contacting an active stylus pen outputting a pen driving signal set to sense the position of the active stylus pen, the pressure of the active stylus pen and the tilt of the active stylus pen to output the driving signals to the driving electrodes;

a touch sensing part being connected to sensing electrodes of the touch screen panel to receive the sensing signals through the sensing electrodes; and a touch determination part determining at least one of touch coordinates of a finger and touch coordinates of the active stylus pen based on the sensing signals;

wherein the touch driving part comprises:

a transmission signal generating part comprising a plurality of transmission signal generator generating driving signals having different frequency components; and a transmission mux part comprising a plurality of transmission muxes having a first transmission input terminal connected to the transmission signal generator, a second transmission input terminal connected to the touch sensing part and a transmission output terminal connected to the driving electrode, wherein the first transmission input terminal is connected to the transmission output terminal or the second transmission input terminal is connected to the transmission output terminal in response to a mux control signal provided from an external device.

15. The touch sensing controller of claim 14, wherein the touch sensing part comprises:

a reception mux part comprising a plurality of reception muxes having a reception output terminal, a first reception input terminal connected to the sensing electrode, and a second reception input terminal connected to a second transmit input terminal of a transmit mux part of the touch driving part, wherein the first reception input terminal is connected to the reception output terminal or the second reception input terminal is connected to the reception output terminal in response to the mux control signal;

a reception sensing part comprising a plurality of reception sensors connected to reception output terminals of the reception muxes;

an analog-to-digital conversion part digitally converting the sensing signals received through the reception sensors; and a fast Fourier transform part Fourier-transforming the sensing signal digitally converted by the analog-to-digital conversion part.

16. An active stylus pen comprising:

a tip electrode contactable with a touch screen panel;

a pressure sensor measuring a pressure of the tip electrode applied to the touch screen panel to output a pressure sensing signal;

a frequency signal generator generating a pressure sensing signal based on the pressure sensing signal, and generating a position sensing signal set for sensing a position of the active stylus pen and a tilt sensing signal set for sensing a tilt of the active stylus pen;

a mixer mixing the position sensing signal and the pressure sensing signal and providing a mixing signal to the tip electrode; and a ring electrode spaced apart from the tip electrode and the pressure sensor by a predetermined distance to receive the tilt sensing signal.

17. The active stylus pen of claim 16, wherein the frequency signal generator further generates a button sensing signal for sensing button on/off of the active stylus pen.

18. An active stylus pen comprising:

a pen body;

a multi-frequency output part disposed in the pen body to output a finger frequency signal and a tip frequency signal;

a stylus tip disposed in an end portion of the pen body to receive the tip frequency signal and to output the tip frequency signal;

a first contact electrode disposed on a side surface of the pen body to receive the finger frequency signal;

a second contact electrode spaced from the first contact electrode to be disposed on another side surface of the pen body and receiving a finger frequency signal from the first contact electrode via a finger; and a controller determining (i) it as an untouch state of the active stylus pen when it is determined that the finger frequency signal is not transmitted to the second contact electrode, determining (ii) it as a touch state of the active stylus pen when it is determined that the finger frequency signal is transmitted to the second contact electrode, and requesting the output of the tip frequency signal to the multi-frequency output part.

19. The active stylus pen of claim 18, wherein the controller interrupts output of the tip frequency when the finger frequency signal is not transmitted during the output of the tip frequency signal.

20. A method of driving an active stylus pen, the method comprising:

generating a finger frequency signal;

providing the finger frequency signal to a first contact electrode disposed on a portion side of a pen body;

determining that the active stylus pen is in an untouched state when it is determined that the finger frequency signal is not transmitted to a second contact electrode spaced from the first contact electrode;

generating a tip frequency signal based on a touch state of the active stylus pen when it is determined that the finger frequency signal is transmitted to the second contact electrode through the first contact electrode; and outputting the tip frequency signal to a stylus tip disposed at an end portion of the pen body.

* * * * *